(12) United States Patent
Balakrishnan et al.

(10) Patent No.: US 7,724,760 B2
(45) Date of Patent: May 25, 2010

(54) METHOD AND APPARATUS FOR BANDWIDTH GUARANTEE AND OVERLOAD PROTECTION IN A NETWORK SWITCH

(75) Inventors: Hari Balakrishnan, Winchester, MA (US); Srinivas Devadas, Lexington, MA (US); Arvind Mithal, Arlington, MA (US)

(73) Assignee: Broadcom Corporation, Irvine, CA (US)

( * ) Notice: Subject to any disclaimer, the term of this patent is extended or adjusted under 35 U.S.C. 154(b) by 1538 days.

(21) Appl. No.: 10/639,269

(22) Filed: Aug. 12, 2003

(65) Prior Publication Data
US 2004/0090974 A1  May 13, 2004

Related U.S. Application Data

(63) Continuation-in-part of application No. PCT/US01/21185, filed on Jul. 5, 2001.

(51) Int. Cl.
  *H04L 12/56* (2006.01)
(52) U.S. Cl. .................. 370/416; 370/230.1; 370/414
(58) Field of Classification Search ............. 370/230.1, 370/414, 416
  See application file for complete search history.

(56) References Cited

U.S. PATENT DOCUMENTS

| | | | |
|---|---|---|---|
| 5,963,557 A | 10/1999 | Eng | 370/432 |
| 6,064,651 A * | 5/2000 | Rogers et al. | 370/233 |
| 6,064,677 A | 5/2000 | Kappler et al. | 370/414 |
| 6,862,265 B1 * | 3/2005 | Appala et al. | 370/235 |
| 7,415,477 B2 | 8/2008 | Devadas et al. | |
| 2003/0086424 A1 * | 5/2003 | Tsubota | 370/392 |
| 2003/0135449 A1 * | 7/2003 | Xu et al. | 705/38 |
| 2004/0081184 A1 * | 4/2004 | Magill et al. | 370/413 |
| 2005/0025141 A1 * | 2/2005 | Chao et al. | 370/386 |

FOREIGN PATENT DOCUMENTS

| | | |
|---|---|---|
| EP | 1 130 855 A | 9/2001 |
| JP | 2000 244502 A | 9/2000 |
| JP | 2000 295228 A | 10/2000 |
| JP | 2001 016206 A | 1/2001 |

(Continued)

OTHER PUBLICATIONS

Linifang Zhang, Zenghua Zhao, Yantai Shu, and Lei Wang, and Oliver W.W. Yang, "Load Balancing of Multipath Source Routing in Ad Hoc Networks", Communications, 2002. ICC 2002, IEEE International Conference on Apr. 28-May 2, 2002, vol. 5, pp. 3197-3201.

(Continued)

*Primary Examiner*—Jason E Mattis
(74) *Attorney, Agent, or Firm*—Sterne, Kessler, Goldstein & Fox P.L.L.C.

(57) ABSTRACT

A method for selecting a queue for service across a shared link. The method includes classifying each queue from a group of queues within a plurality of ingresses into one tier of a number "N" of tiers. The number "N" is greater than or equal to 2. Information about allocated bandwidth is used to classify at least some of the queues into the tiers. Each tier is assigned a different priority. The method also includes matching queues to available egresses by matching queues classified within tiers with higher priorities before matching queues classified within tiers with lower priorities.

29 Claims, 19 Drawing Sheets

FOREIGN PATENT DOCUMENTS

| JP | 2002 135269 A | 5/2002 |
|---|---|---|
| WO | WO 00/56024 A | 9/2000 |
| WO | WO 03/005227 A1 | 1/2003 |

OTHER PUBLICATIONS

Miltos D. Grammatikakis and Stefan Liesche, "Priority Queues and Sorting Methods for Parallel Simulation", IEEE Transactions on Software Engineering, vol. 26, No. 5, May 2000, pp. 401-442.

R.J. Gibbens and F.P. Kelly, "On Packet Marking at Priority Queues", IEEE Transactions on Automatic Control, vol. 47, No. 6, Jun. 2002, pp. 1016-1020.

Sangman Bak, Albert M.K Cheng, Jorge A. Cobb, and Ernest L. Leiss, "Load Balanced Routing and Scheduling for Real-Time Traffic in Packet-Switch Networks", Local Computer Networks, 2000. LCN 2000. Proceedings. 25th Annual IEEE Conference on Nov. 8-10, 2000, pp. 634-643.

Yuji Nomura, Akira Chugo, Motomistu Adachi, and Masahito Toriumi, "A Policy Based Networking Architecture for Enterprise Networks", Communications, 1999. ICC 1999. 1999 IEEE International Conference on Jun. 6-10, 1999, vol. 1, pp. 636-640.

Choudhury, A.K. and E.L. Hahne, "Dynamic Queue Length Thresholds for Shared-Memory Packet Switches", IEEE Transactions on Networking, vol. 6, No. 2, Apr. 1998, pp. 130-140.

Hluchyj, M.G. and M.J. Karol, "Queuing in High-Performance Packet Switching", IEEE Journal on Selected Areas in Communications, vol. 6, No. 9, Dec. 1998, pp. 1587-1597.

Hluchy, M.G. et al., "Queueing Disciplines for Integrated Fast Packet Networks," *Discovering a New World of Communications (Proceedings of the International Conference on Communications)*, Jun. 14-18, 1992; pp. 990-996; IEEE, New York, US.

EP Search Report, dated Apr. 29, 2009, for EP Patent Application No. EP 01 27 4353, 6 pages.

Esp@cenet Database, English language abstract of JP 2000 244502 (listed as document FP1 on the accompanying form PTO/SB/08A).

Esp@cenet Database, English language abstract of JP 2000 295228 (listed as document FP2 on the accompanying form PTO/SB/08A).

Esp@cenet Database, English language abstract of JP 2001 016206 (listed as document FP3 on the accompanying form PTO/SB/08A).

Esp@cenet Database, English language abstract of JP 2002 135269 (listed as document FP4 on the accompanying form PTO/SB/08A).

* cited by examiner

| Tier / Property | Queue is special | Queue is empty | Queue is aged | Queue is anemic | Queue is hungry | Type of queue |
|---|---|---|---|---|---|---|
| S | Y | N | - | - | - | - |
| A | N | N | Y | - | - | - |
| B | N | N | N | N | Y (alternately -) | EF |
| C | N | N | N | N | Y | AF |
| D | N | N | N | N | N | - |
| E | N | N | N | Y | - | - |
| F | N | Y | - | - | - | - |

FIG. 15

METHOD AND APPARATUS FOR BANDWIDTH GUARANTEE AND OVERLOAD PROTECTION IN A NETWORK SWITCH

This application is a continuation-in-part of International Application Number PCT/US01/21185, filed on Jul. 5, 2001 and designating the United States, and entitled "Method and Apparatus for Allocating Link Bandwidth." The entire disclosure of the prior application is hereby incorporated by reference.

FIELD

The present invention relates generally to a method and system for allocating bandwidth over a shared link, and more particularly to such methods and systems that streamline protocol processing and maintain quality of service guarantees.

BACKGROUND

FIG. 1 shows a typical switching system 10 for managing traffic of packets of information over a network backbone. The system 10 contains one or more input ingresses I1, I2, I3, one or more output egresses E1, E2, E3, and a switch or crossbar 12. The ingresses I1, I2, I3 are switches, routers, computers, or other devices through which packets enter the switching system 10. Similarly, the egresses E1, E2, E3 are computers, switches, routers, or other devices through which packets leave the switching system 10. Three ingresses I1, I2, I3 and three egresses E1, E2, E3 are depicted in FIG. 1, although any number of ingresses and egresses can be connected in the switching system 10. Packets of data enter the ingresses I1, I2, I3 through traffic sources 14 and exit from the egresses E1, E2, E3, through traffic exits 16. In typical operation, the switching system 10 can connect a given ingress to a given egress through the crossbar or switch 12 such that there is a one-to-one mapping between an ingress and egress, or it can connect a given ingress to one or more egresses such that there is a one-to-many mapping between ingresses and egresses. In other words, for every timeslot for transfer of data through the switching system 10, each egress can only receive data from a single ingress. However, an ingress can send data to multiple egresses. Further, each ingress I1, I2, I3, contains a plurality of queues for storing packets of data and each egress E1, E2, E3 contains a plurality of buffer FIFOS (First-In-First-Out). For each timeslot, a single queue within each ingress can be connected to one or more ports within one or more egresses. For example, during a given timeslot, queue Q2 within ingress I1 can be connected to buffer FIFO1 within egress E3, queue Q1 within ingress I2 can be connected to buffer FIFO1 within egress E1, and queue Q1 within ingress I3 can be connected to buffer FIFO3 of egress E2.

Generally, one goal of a switching system, such as the system 10 of FIG. 1, is to maximize usage of the switch or crossbar 12 such that its valuable bandwidth (a so-called scarce resource) is used efficiently. A second goal of switching systems can be to service packets for customers depending on Quality-of-Service (QoS) guarantees. Another goal of switching systems can be to prevent certain packets from being queued in the switching system for unacceptably long periods of time prior to transmission through the system 10. A need exists for accomplishing these goals with improved methods and systems.

The size of a timeslot for data transfer across the switch or crossbar 12 in the switching system 10 of FIG. 1 generally determines the amount of data that can be sent in a single timeslot. Two methods are commonly used to select the size of a timeslot for data transfer in currently implemented switching systems, such as the system 10 of FIG. 1, where packet sizes vary considerably. The first method is to use a timeslot size that is sufficiently large so that most packets of information in the queues can be transmitted through the switch or crossbar 12 during a given timeslot. A problem with such a method, however, is low utilization of the system 10. Portions of each timeslot will likely not be filled, and hence the available bandwidth, which is generally costly, will not be used.

The second method used to select timeslot size is to use a timeslot size that is smaller than that used in the first method. Then, however, packets that are larger than the timeslot must be broken into more than one segment so that each segment will fit through the switching system 10 in a single timeslot. This second method may reduce the low utilization problem associated with the first method discussed above; however, it requires that the packets be broken (segmented) into multiple segments at an ingress I1, I2, I3 and then rebuilt (reassembled) at an egress E1, E2, E3. Such segmentation and reassembly can constrain the performance of the switching system 10.

A need exists for a method and system for allocating bandwidth over a link that properly allocates the bandwidth to maximize utilization of bandwidth, ensure QoS guarantees, and prevent packets from being queued indefinitely in a switching system while, at the same time, ensuring that the method and system operate in a "fair" manner. Finally, a need exists for a method and system for maximizing utilization of a timeslot for data transfer without causing a segmentation and reassembly problem.

SUMMARY

One embodiment of the invention relates to a method for selecting a packet for transmission across a shared link. In this embodiment, the method features determining a priority for a first-out packet in each of a plurality of queues within each of a plurality of ingresses, for each group of first-out packets within the queues of each ingress which are destined for a particular egress, selecting a first-out packet having a first priority; for each subset of selected first-out packets having first priorities and being destined for the particular egress, selecting a first-out packet having a second priority; and transmitting from each ingress across the shared link the selected first-out packet having the second priority.

Another embodiment of the invention is a computer-readable medium storing instructions that direct a microprocessor to determine a priority for each queue within a plurality of ingresses, wherein the priority is instantaneous for a given timeslot for data transfer, for each group of queues within each ingress having packets destined for a particular egress, select a queue having a first priority, for each subset of selected queues having first priorities and having packets destined for the particular egress, select a queue having a second priority, and service the selected queue having the second priority for each subset across the shared link in the given timeslot.

Another embodiment of the invention relates to a system for selecting a queue for service across a shared link. In this embodiment, the system features an element for determining a priority for each queue within a plurality of ingresses, wherein the priority is instantaneous for a given timeslot for data transfer; an element for selecting a queue having a first priority for each group of queues within each ingress having packets destined for a particular egress; an element for selecting a queue having a second priority for each subset of selected queues having first priorities and having packets destined for the particular egress; and an element for servicing the selected queue having the second priority for each subset across the shared link in the given timeslot.

Another embodiment of the invention is a method for selecting a queue for service across a shared link. First, the method includes classifying each queue from a group of queues within a plurality of ingresses into one tier of a number "N" of tiers. In each timeslot or for a subset of timeslots, the current state of each ingress virtual output queue (VOQ) (and therefore the current state of each ingress) is mapped to a tier. In other words, characteristics about each queue are used to assign the queue to a tier of queues. The number "N" of tiers is greater than or equal to 2. Each tier is assigned a different priority. Second, the method includes matching queues to available egresses by matching queues classified within tiers with higher priorities before matching queues classified within tiers with lower priorities. In each timeslot, given a set of tiers of queues, this embodiment of the invention produces a per-tier maximal matching. That is, if there are "N" tiers, this embodiment starts at the highest tier and produces a maximal matching between ingresses and egresses considering only those VOQs that are in that tier. Then, from among the remaining unmatched ingress-egress VOQs, this embodiment produces a maximal matching at the next lower tier, and so on.

BRIEF DESCRIPTION OF THE DRAWINGS

FIG. 15 is a table illustrating the classification of queues into five tiers based on various properties in accordance with the embodiment of the invention of FIG. 13.

DETAILED DESCRIPTION

A. General Overview

The embodiments of the invention provide for configurable, weighted, and distributed scheduling methods and systems that can be used to implement QoS guarantees for data transfer and to fairly determine which queue to service during a given timeslot.

1. System Architecture

Figure 2:
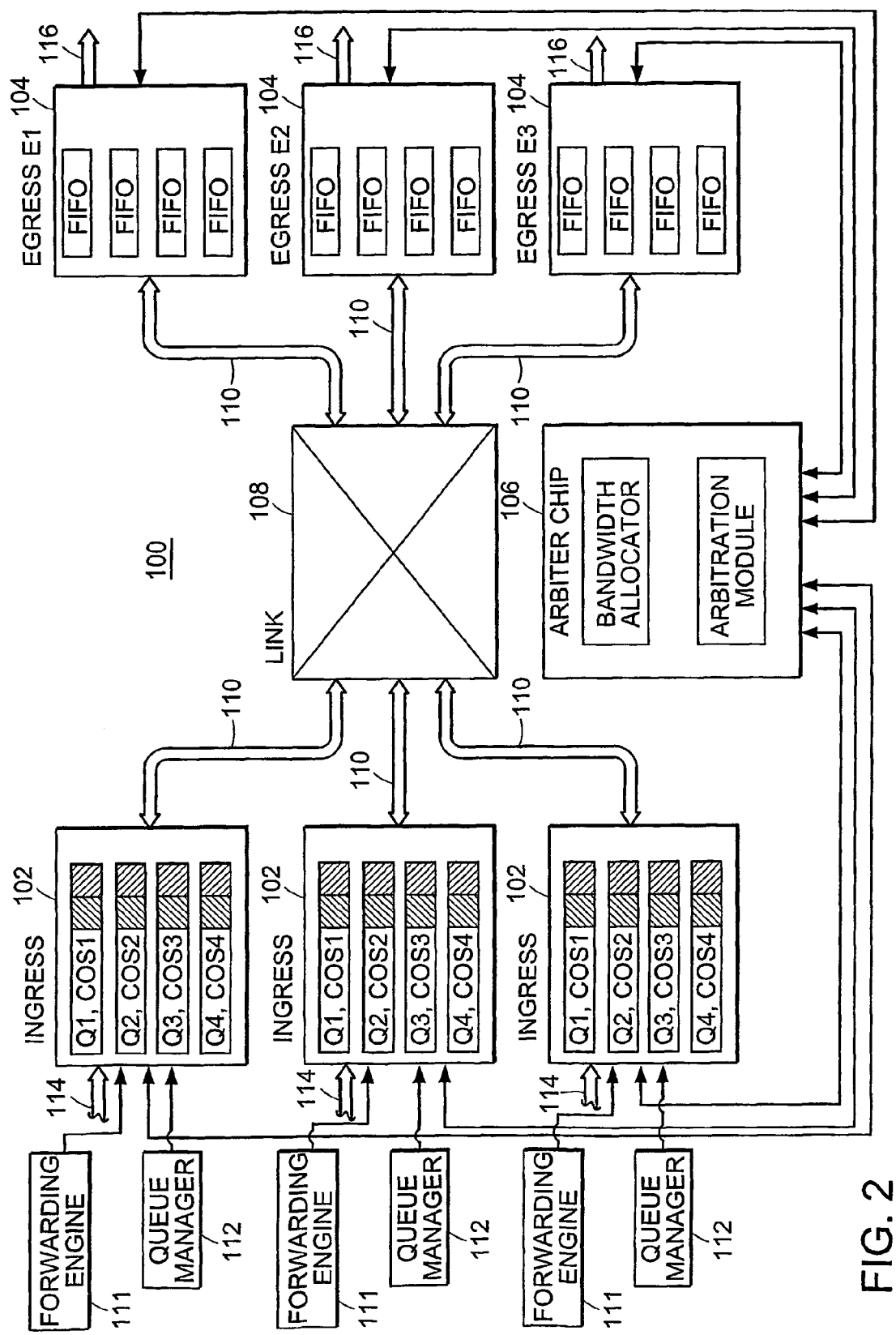
FIG. 2 is a block diagram of one embodiment of the system of the invention.

FIG. 2 shows a block diagram of a system 100 according to an embodiment of the invention. The system 100 of FIG. 2 contains a number of modular components, which, in one embodiment, are chips. The system 100 of FIG. 2 contains one or more ingress chips 102, one or more egress chips 104, an arbiter chip 106, and a shared switch or crossbar chip or link 108 that can connect any ingress 102 to any egress 104 using pipelines 110. In addition, each ingress 102 can have associated therewith a forwarding engine or queue manager 112. Packets of data enter the ingresses 102 from traffic sources 114 and exit the egresses 104 to traffic outputs 116. A plurality of ingresses 102 can be linked to a plurality of egresses 104 over the shared link 108. For example, in one embodiment, sixty-four ingresses 102 can be linked to sixty-four egresses over the shared link 108.

The embodiments described below operate in a shared link system, which is a system having a shared link 108 connecting one or more ingresses 102 to one or more egresses 104. For every timeslot for transfer of data through the system 100, each egress 104 can only be connected to a single ingress 102, although a single ingress 102 can be connected to one or more egresses 104. Throughout this specification, therefore, the term "shared link system" will be used to refer to a system through which one or more egresses can be connected to a single ingress to transfer data during a given timeslot. The term "shared link," similarly, will be used throughout this specification to refer to the linking device, switch, or crossbar that is configurable for each timeslot for data transfer and is used in the shared link system to connect one or more egresses to a single ingress to transfer data.

Figure 3A:
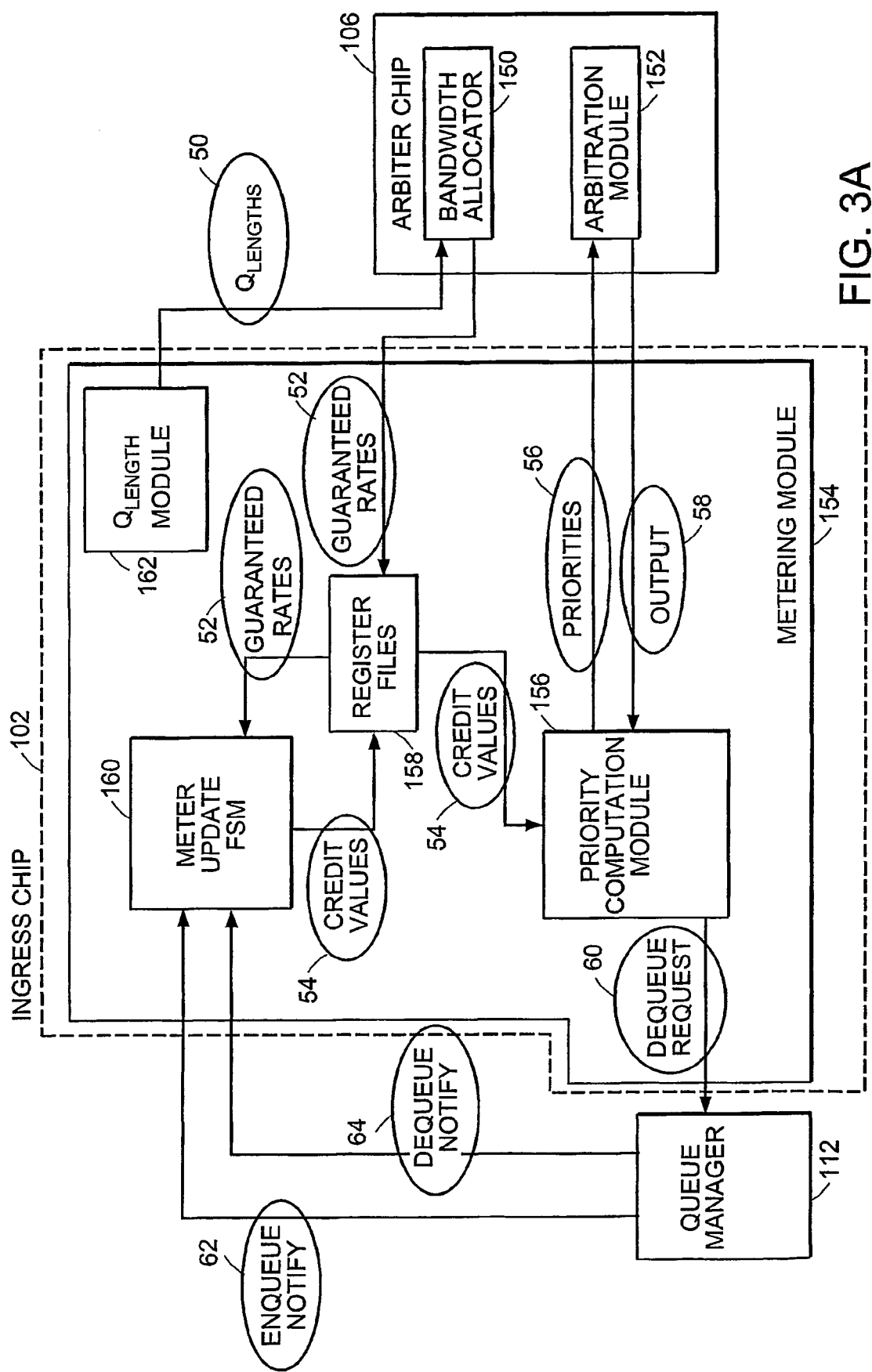
FIG. 3A is a block diagram of one embodiment of the arbiter chip, ingress chip, and queue manager of the invention.

In an embodiment using chips as the molecular components of the invention, each chip can be an integrated circuit chip having a signal processing unit and an interface unit. The signal processing unit can run at any speed sufficient to perform the operations described herein. In one embodiment, for example, a 1 GHz processor is used in the arbiter chip 106. The functions of each module of the invention can be performed in software or in hardware. FIG. 3A depicts an ingress chip 102 having register files 158, and such an ingress chip 102 can have hardware or firmware modules therein to perform the functions of the invention.

Each traffic source 114 connected to each ingress 102 and each traffic output 116 connected to each egress 104 has an associated bandwidth rate, such as 10 Gbps. In one embodiment, each pipeline 110 connecting an ingress 102 or an egress 104 to the shared link 108 has an associated bandwidth rate that is larger than the traffic source 114 bandwidth rate or traffic output 116 bandwidth rate. The pipelines 110, therefore, can be high-speed links. For example, if the bandwidth rate of traffic source 114 into an ingress 102 is 10 Gbps, the pipeline associated therewith to connect to the shared link 108 can have a bandwidth rate of 10-20 Gbps. In such an embodiment, the system 100 of the invention is able to make bandwidth guarantees over the shared link 108 due in part to the fast pipelines 110 into and out of the link 108 compared to the bandwidth rates into the ingresses 102 or out from the egresses 104. In other embodiments, the pipelines 110 have bandwidth rates that are the same as the traffic source 114 or traffic output 116 bandwidth rates.

FIG. 3A is a block diagram of one embodiment showing a single arbiter chip 106, ingress chip 102, and forwarding engine or queue manager 112 of the invention. In one embodiment, the arbiter chip 106 contains a bandwidth allocator module 150 and an arbitration module 152. Depicted in FIG. 3A in the ingress 102 is a metering module 154, which includes a priority computation module 156, register files 158, a metering update module 160, and a queue length module 162. In one embodiment, the bandwidth allocator module 150 and the arbitration module 152 reside within the ingress 102, as can the queue manager 112. In a system with multiple ingresses 102 attached to a shared link 108, such as the system 100 of FIG. 2, it can be desirable to have the bandwidth allocator module 150 and the arbitration module 152 in a separate arbiter chip 106 such that a single arbiter chip 106 is used to service a plurality of ingresses 102. The functions of each module are described in detail below.

The embodiment of FIG. 3A depicts a single ingress 102 and a single arbitrator chip 106. More typically, however, a single arbitrator chip 106 is used in a system with multiple ingresses 102, such as the system 100 of FIG. 2.

Each ingress 102 of the system 100 contains a plurality of buffer queues. FIG. 2 depicts ingresses 102, each having four queues Q1, Q2, Q3, Q4, although any number of queues can be in each ingress 102. In one embodiment, an ingress chip 102 contains 1024 queues. Associated with each queue is a class of service (COS) for that queue. Each COS refers to a different level of service for the packets in the queue associated with that COS. For example, queue Q1 in each ingress 102 of FIG. 2 has COS1, queue Q2 has COS2, queue Q3 has COS3, and queue Q4 has COS4. COS1 can be associated with a bandwidth rate of 1 gigabytes per second (Gbps), COS2 can have a bandwidth rate of 0.25 Gbps, and so forth, such that the packets in queues with different COSs are serviced at different rates. As packets of data enter each ingress 102, the packets are buffered in an appropriate queue corresponding to the COS for that packet. Packets in queues with better (or higher) COSs need to be serviced faster than packets in queues with worse (or lower) COSs. Each packet in a queue is destined for a particular, but not necessarily the same, egress (i.e., the packet contains data indicating that it desires to be sent to that egress). A forwarding engine 111 associated with each ingress 102 can route packets of data entering the ingress 102 to an appropriate queue within the ingress 102.

Each egress 103 of system 100 generally contains a number of FIFO (First-In-First-Out) buffers or ports to buffer packets received through the shared link 108 before the packets are sent out through the traffic outputs 116. In one embodiment of the invention, a single chip can function as either an ingress 102 or as an egress 104. Such a chip would contain an ingress side that could perform the functions of an ingress 102, as described below, and an egress side with FIFOs to perform the functions of an egress 104.

Figure 3B:
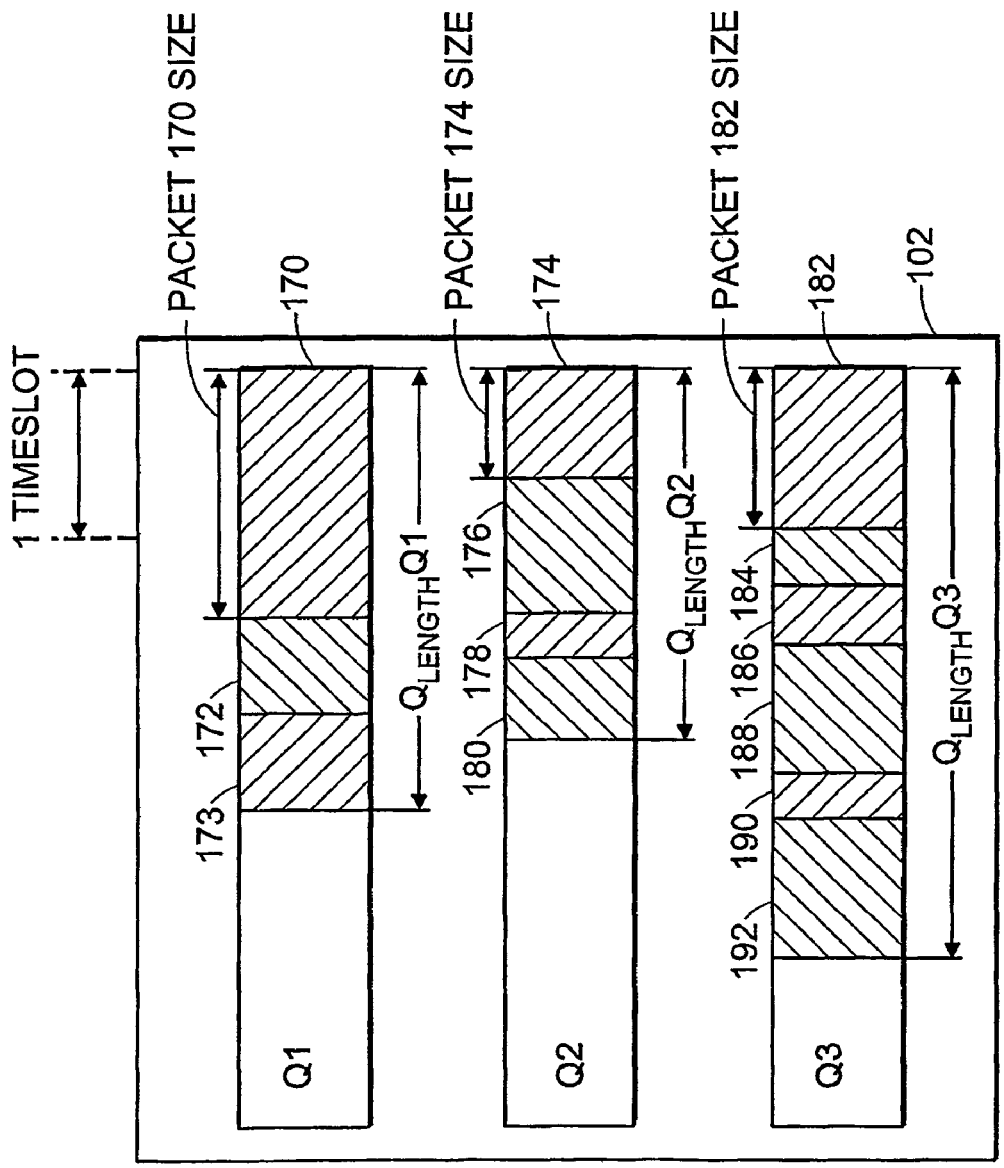
FIG. 3B is a block diagram showing packets of data within queues of an ingress.

FIG. 3B shows a detailed view of packets within queues of ingress 102. FIG. 3B shows a single ingress 102 having queues Q1, Q2, and Q3, although, as noted above, a larger number of queues may reside within an ingress 102. As FIG. 3B depicts in simplified visual form, each queue Q1, Q2, Q3 contains a number of packets buffered within the queue. For instance, queue Q1 contains packets 170, 172, and 173, queue Q2 contains packets 174, 176, 178, and 180, and queue Q3 contains packets 182, 184, 186, 188, 190, and 192. At the head of queue Q1 is packet 170, at the head of queue Q2 is packet 174, and at the head of queue Q3 is packet 182. In accordance with this embodiment, in each timeslot in which data will be sent over the shared link 108 of the system 100 of the invention, only the packet or packets at the head of each queue (a first-out packet or packets) that fit within a single timeslot are eligible to contend for access to the shared link 108. For the next timeslot, for the depiction of FIG. 3B, therefore, only packets 170, 174, and 182 are available to contend for access to the shared link 108. A timeslot is a fixed unit of time, and in each timeslot the shared link 108 can be configured for data transfer. In one embodiment, the timeslot can be set to about 200-650 nanoseconds, although the timeslot size can vary in different embodiments. Approximately 460-1,500 bytes of data can be transferred over the shared link 108 in a 200-650 nanoseconds timeslot in the illustrated embodiment.

FIG. 3B also illustrates in block form that packets within the queues of an ingress 102 can be of varying size, and the size of the queues within an ingress 102 can also vary in size. For example, packet 170 in queue Q1 has a packet size that is larger than packet 174 in queue Q2, and also larger than packet 182 in queue Q3. In addition, packet 182 in queue Q3 is also larger in size than packet 174 in queue Q2. Such packet sizes can be measured in bytes or in bits. FIG. 3B also shows the size of a single timeslot, in this embodiment, for data transfer across the shared link 108. Packet 170 is larger in size than a single timeslot, while packet 174 and packet 182 both appear to be smaller than or equal to the size of a single timeslot. Finally, FIG. 3B depicts the size of each queue (Qlength), at a particular instant in time, within the ingress 102. For example, queue Q1 has QlengthQ1 that is larger than QlengthQ2 for queue Q2, but smaller than QlengthQ3 for queue Q3. FIG. 3B depicts a simplified ingress 102 where only a small number of packets reside within each queue, but the concept of Qlengths is illustrated. A Qlength is a measure of the size of the data stored at a particular instant in time within a given queue, and can therefore be measured in bytes. Note that in the embodiment illustrated in FIG. 3B, each queue has the same total length (capacity) available for buffering of packets, although in other embodiments, these lengths may also vary.

2. Overview of System Operation

Figure 4A:
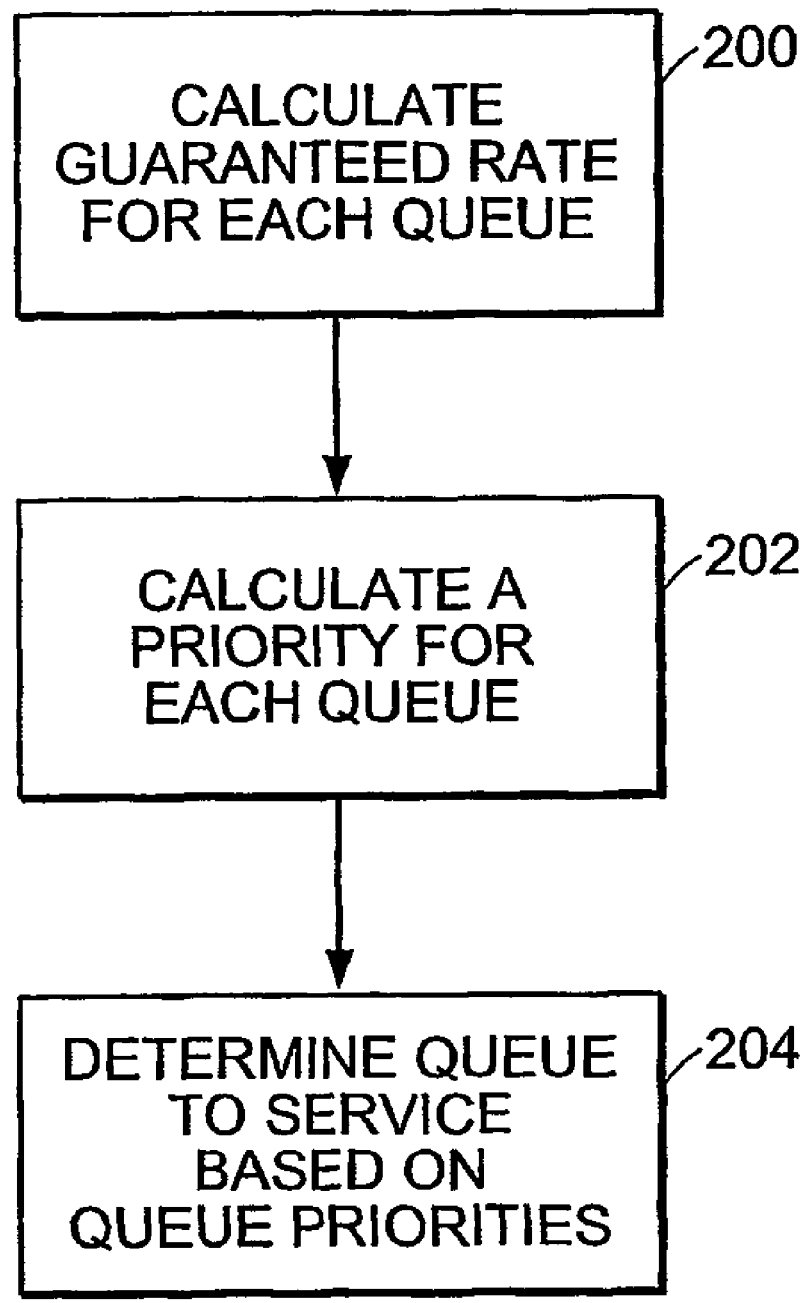
FIG. 4A is a flow chart showing one embodiment of the methods of the invention.

FIG. 4A is a flow chart showing one embodiment of the operation of the invention. Generally, the invention involves calculating a guaranteed rate for each queue based on queue metric information for the queue (block 200), calculating a priority for each queue during a given timeslot (block 202) based on the guaranteed rate for the queue, and determining a queue to service during a given timeslot based on the priority of each queue (block 204).

As used throughout this specification, a "guaranteed rate" generally refers to an update rate for a queue that is used to allocate bandwidth in a system. The unit of such a guaranteed rate may be, for instance, Gbps. The guaranteed rates control the bandwidth available to each queue since they are used to control the rate at which a credit value associated with each queue increases with time. Each queue of each ingress has a credit value associated with it, and the guaranteed rate for each queue can be used to increase the credit value for the queue if the queue is not serviced during a given timeslot. The credit values, in turn, can be used to update a priority for each queue in the system. As used throughout this specification, a "priority" refers to the desire of a given queue to communicate with a given egress during a timeslot for data transfer.

Generally, therefore, the queue to be serviced during each timeslot is determined based on the priorities calculated for each queue during each timeslot. Queues having high priorities for communication with a given egress, for instance, will be serviced before queues having lower priorities for communication with that same egress. The shared link 108 of FIG. 2 is reconfigured for each timeslot based on the priorities to assign a one-to-one mapping between ingresses and egresses. The guaranteed rates, therefore, indirectly control how often each queue is serviced or, alternatively, how often a subset of queues is serviced.

The bandwidth allocator module 150 is used, in this embodiment, to calculate the guaranteed rate for each queue in the system 100 (block 200 of FIG. 4A). The guaranteed rates are calculated according to a number of methods using some queue metric information received from the queue length module 162 or the queue manager 112. The queue metric information used to calculate the guaranteed rates is information about the queue, such as, but not limited to, the Qlength of the queue (i.e., bytes) or the arrival rate (i.e., bytes per second) of data to the queue. The queue manager 112 can calculate or track arrival rate information of data to the queue, and the queue length module 162 can calculate the current length or size of the queue. Some methods for calculation of guaranteed rates are discussed in greater detail below in connection with FIGS. 5-7B. Generally, to calculate a guaranteed rate, the queue length module 162 (or the queue manager 112) of FIG. 3A measures and sends queue metric information for each queue of the corresponding ingress 102 to the bandwidth allocator module 150. FIG. 3A, for instance, depicts the Qlengths 50 for the queues being sent to the bandwidth allocator module 150. Using the bandwidth allocation methods discussed below, the bandwidth allocator module 150 then calculates a guaranteed rate for each queue of each ingress 102 of the system 100, and sends the guaranteed rates 52 to the corresponding ingress 102. These guaranteed rates can be calculated periodically (i.e., not necessarily each timeslot) and then periodically communicated to the corresponding ingress 102.

The meter update module 160 of the metering module 154 of each ingress 102, in this embodiment, then uses the guaranteed rates to update a credit value for each queue in the ingress 102. The meter update module 160, on one embodiment, updates a credit value for each queue during every timeslot for data transfer across the shared link 108. FIG. 3A depicts the meter update module 160 receiving the guaranteed rates 52 from the bandwidth allocator module 150 through the register files 158, and then transmitting the updated credit values 54 to the register files 158. The credit values 54 or other information about the queues are used to calculate priorities for service of each queue in this embodiment. The credit values can be updated in the meter update module 160 according to a number of methods. Generally, the credit value for a given queue is increased for the queue after each timeslot. The increase of the credit value increases the corresponding priority for the queue, thus incrementing the priority of the queue over a number of timeslots so that the queue will eventually be serviced. In this embodiment, if the queue is serviced during a given timeslot, the credit value for the queue is decreased so that the connection to the shared link 108 will not be maintained indefinitely (i.e., the priority for the queue is decreased). A number of methods can be used to update credit values for queues, and one such method is discussed below in greater value in connection with FIG. 8.

In this embodiment, the priority computation module 156 of the metering module 154 of the ingress 102 uses the credit values or other information about the queues to calculate a priority (block 202 of FIG. 4A) with which each queue desires to be serviced over the shared link 108. FIG. 3A depicts the priority computation module 156 receiving the credit values 54 for the queues of the ingress 102 from the register files 158 and then sending priorities 56 to the arbitration module 152. The priority for each queue can be, in one embodiment, the same value as the credit value for each queue. In other embodiments, however, the priority is a scaled version of the credit value for each queue, and the priority can also be modified beyond a simple scaling depending on other characteristics, as is discussed further below.

Certain of the priorities 56 from a given ingress 102 are sent to the arbitration module 152 in this embodiment, as shown in FIG. 3A. In addition, each egress 104 sends information on the fullness state of its FIFOs to the arbitration module 152. The arbitration module 152 then determines the ingress 102 that will be connected to each egress 104 during a given timeslot (block 204 of FIG. 4A). The arbitration module 152 sends an output 58 back to the priority computation module 156, as seen in FIG. 3A. Output 58 can simply be a designation of which egress 104 the ingress 102 will have access to during a given timeslot. The metering module 154 can then determine which queue in the ingress 102 to service, based on the egress 104 to which the ingress 102 has access during the timeslot.

The selection of an ingress 102 for each egress 104 in the arbitration module 152 is based on priorities, and this selection process can be referred to as arbitration. Generally, the priorities 56 determine which ingress 102 to connect to which egress 104 during a given timeslot, and which queue within an ingress to service during that timeslot. In one embodiment, the ingress 102 with a queue that desires a given egress 104 with the greatest priority is chosen for connection to the given egress 104 during a timeslot. In addition, a queue within that selected ingress 102 that desires the egress 104 and has the greatest priority is the queue within that ingress 102 that is serviced during the timeslot. Some methods used for queue selection in various embodiments of the invention are discussed further below in connection with FIGS. 9-11. In any event, configuration of the shared link 10 for the timeslot in accordance with the ingress 102 to egress 104 mappings follows arbitration. A message containing instructions (not shown in Figures) is therefore sent to the shared link 108 each timeslot to indicate the mapping between ingress and egress that the shared link 108 should produce. The shared link 108 then establishes a connection between ingresses and egresses for the timeslot in accordance with the instructions.

In one embodiment of the invention, a maximum priority level is reserved for a queue with a packet contained therein that is larger than a single timeslot. FIG. 3B, for example, shows that packet 170 has a size that is larger than a given timeslot. In one embodiment of the invention, a connection over the shared link 108 of the system 100 is maintained for a sufficient period of time such that an entire packet that is larger than a single timeslot can be transferred continuously over the shared link 108 without interruption. Such a maintained connection ensures that a packet need not be segmented into multiple packets in an ingress 102 and then reassembled at an egress 104 after all of the segments of the packet are transmitted over the link 108. Such a system maximizes utilization of the shared link 108 by allowing the size of a timeslot to be set at an appropriate length of time. That is, the timeslot size for data transfer is set at a low enough level such that utilization of the shared link 108 is high. This method of the invention, however, also solves the segmentation and reassembly problem by maintaining single or multiple connections over the shared link 108 to transfer packets larger than a single timeslot.

A partial packet variable can be used by the system of the invention to denote such a packet that is too large for transfer across the shared link in a single timeslot. Such a partial packet variable indicates that the current packet to be serviced in the queue is too large to be serviced in a single timeslot, and that a connection should be maintained over the shared link 108 for a sufficient number of timeslots to transfer the entire packet. The maximum priority level, therefore, can be allocated to a queue if such a partial packet variable is associated with the queue at a given time.

The queue manager 112 of FIG. 3A generally services the queues and sends updated messages regarding the state of the queues depending on the event(s) that takes place during a given timeslot. The queue manager 112, for example, sends a dequeue notification 64 to the meter update module 160 when a packet is sent from a queue. This is a dequeue event. The queue manager 112 also sends an enqueue notification 62 to the meter update module 160 when a packet is received and buffered within a given queue. This is an enqueue event. FIG. 3A also depicts a dequeue request 60 being sent from the priority computation module 156 to the queue manager 112. This dequeue request 60 indicates the queue to be serviced in a given timeslot based on the arbitration process. The queue manager 112, therefore, can service the queue in accordance with the dequeue request 60.

An event generated by the queue manager 112, therefore, begins the series of computations discussed above, and causes an update of the credit value and possibly Qlength for a queue. A priority for each queue is then determined based on the credit value or other information, such as a partial packet variable, associated with the queue. A priority with which each ingress desires each egress is determined using the priority computation module 156 and arbitration module 152. These priorities generally determine an ingress to be associated with each egress for a given timeslot.

In an embodiment in which the functions of the metering module 154 and queue manager 112 are performed in hardware, the timing of the functions described above can be as follows for a timeslot size of about 200 nanoseconds. Arbitration and configuration of the link 108 are both performed on the basis of the fixed timeslots. Arbitration, however, preferably precedes configuration of the link 108 by a small number of timeslots due to latencies in the system. Thus, the arbitration module 152 can perform arbitration for about the first 100 nanoseconds of a timeslot, and then a message can be sent to each ingress 102 indicating the egress 104 with which it will communicate for a particular timeslot, which can be about 300-500 nanoseconds after the message is sent. Each ingress 102 will then respond to the arbiter chip 106 with updated priority information. In addition, each egress 104 can send information on the fullness state of its FIFOs. FIG. 2, for instance, depicts connections between the egresses 104 and the arbiter chip 106 over which such fullness state information may be sent. The actual configuration of the link 108 and transfer of packets takes place, therefore, a short time (300-500 nanoseconds in this embodiment) after the message containing the egress, for an ingress, is received by the ingress 102.

In one embodiment of the invention, the priorities for each queue are updated every timeslot and the guaranteed rates for each queue are updated less frequently. For example, the guaranteed rates can be updated every 100 timeslots. QoS guarantees for a system are determined over some discernable period of time that consists of more than one timeslot, so bandwidth allocation, which is controlled using the guaranteed rates, needs to be adequate on average over a given plurality of timeslots and not for a single or even a few timeslots.

FIG. 3A depicts data that flows between the modules of the system 100 during operation in accordance with one embodiment of the invention. The data will be messages or signals representing the information described above. The messages sent between the modules as described above contain only updated information from information sent in previous timeslots, thus eliminating duplicative data transfers and reducing the amount of information that is transferred between modules. In addition, a single message containing Qlengths 50 and priorities 56 will be sent to the arbitrator chip 106 from the ingress 102, rather than the separate messages shown in FIG. 3A. In addition, a single message containing an output egress 58 and updated guaranteed rates 52 can be sent from the arbitrator chip 106 to the ingress 102, rather than the separate messages shown in FIG. 3A.

Figure 4B:
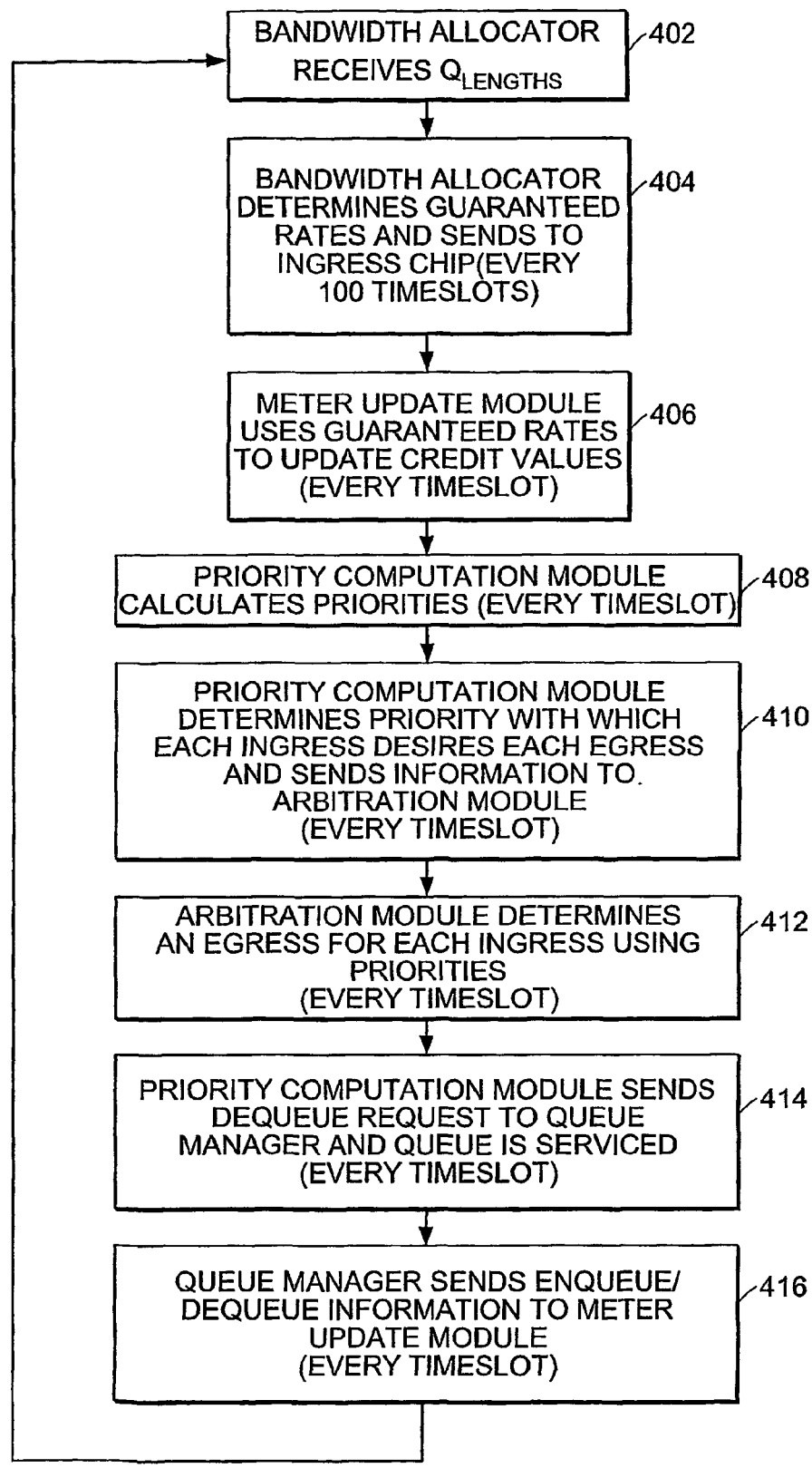
FIG. 4B is a flow chart showing one embodiment of the methods of the invention in greater detail than FIG. 4A.

To review, FIG. 4B is a flow chart showing one embodiment of the operation of the invention in greater detail than FIG. 4A. In this embodiment, the bandwidth allocator 150 receives Qlength information at block 402. At block 404, the bandwidth allocator 150 determines guaranteed rates for the queues and sends these guaranteed rates to the ingress chip 102. The guaranteed rate for each queue may be calculated in the bandwidth allocator 150 and sent to the ingress chip 102 once in every 100 timeslots in this embodiment. At block 406, the meter update module 160 uses the guaranteed rate for each queue to update a credit value for the queue. This updating of credit values can take place every timeslot in this embodiment. At block 408, the priority computation module 156 calculates a priority based on the credit value or other information about the queue, such as whether a partial packet is present. This priority calculation can also take place every timeslot. At block 410, the priority computation module 156 determines a priority with which the ingress desires to communicate with each egress of the system or, in other embodiments, the priority computation module 156 selects a plurality of queues that might have the largest priority for each egress. In either event, information is sent to the arbitration module 152 indicating these priorities. This act can also take place each timeslot. At block 412, the arbitration module 152 uses the priorities to determine an ingress for each egress, and such a determination is performed every timeslot. At block 414, the priority computation module 156 sends a dequeue request to the queue manager 112 every timeslot in accordance with the egress selected for the ingress, and the queue manager services the appropriate queue. At block 416, the queue manager 112 sends enqueue/dequeue information to the meter update module 160, and then the process beginning at block 402 is repeated.

B. Methods for Calculating Guaranteed Rates

Figure 5:
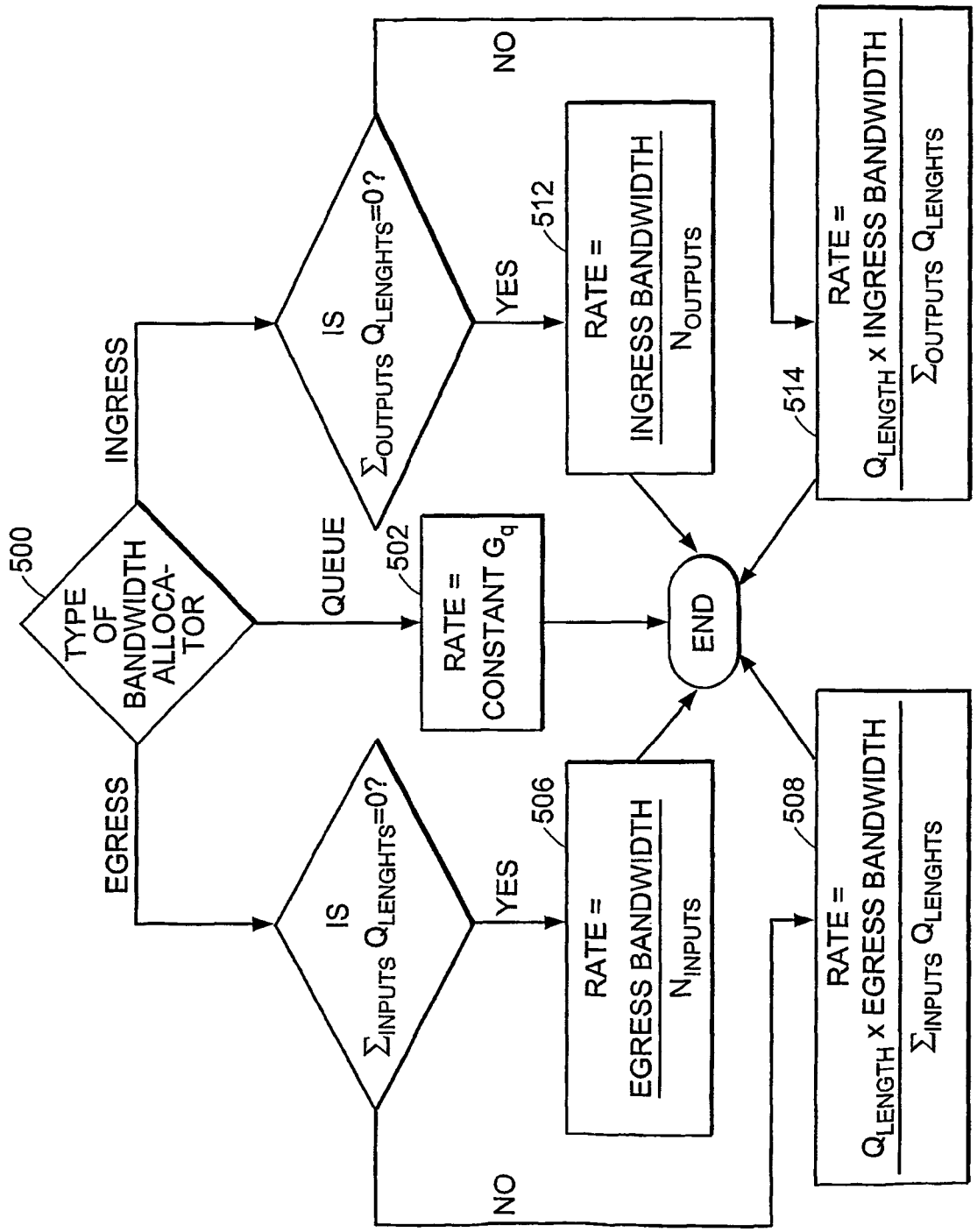
FIG. 5 is a flow chart illustrating one embodiment of the calculation of bandwidth rates for three different types of bandwidth allocation.

A number of methods can be used within the scope of the invention to calculate the guaranteed rates for the queues of the ingresses 102 of the system 100. Generally, the guaranteed rates are used to allocate bandwidth and, therefore, maintain QoS guarantees. Discussed herein are four methods for guaranteeing bandwidth: (1) guaranteeing bandwidth for a single queue, (2) guaranteeing bandwidth for an egress, (3) guaranteeing bandwidth for an ingress, and (4) guaranteeing bandwidth for a group of queues. FIG. 5 depicts the first three of these methods for guaranteeing bandwidth.

1. Guaranteeing Queue Bandwidth

To guarantee bandwidth for a particular queue Q within an ingress, the guaranteed rate for the queue is set to an appropriate value $g_q$, which can remain constant for a number of timeslots. Such a constant value $g_q$ guarantees that over any reasonably long period of time, the average bandwidth the queue obtains is $g_q$, provided that the flow into the queue has an arrival rate that is at least equal to $g_q$. In one example, for instance, the value $g_q$ can be set to a value of 0.25 Gbps to allocate a bandwidth rate of 0.25 Gbps to the queue over a reasonably long period of time. FIG. 5 depicts the act of setting the value $g_q$ in block 502.

In one embodiment that calculates guaranteed rates in hardware, the bandwidth allocator module 150 simply sets appropriate values in the rate registers to guarantee bandwidth for any given queue. The bandwidth allocator module 150 can limit the value of the rate $g_q$ to be no higher than the arrival rate for the particular queue, which ensures that an idle queue does not accumulate unreasonably large credit and possibly waste bandwidth.

2. Guaranteeing Bandwidth at an Egress

Figure 6A:
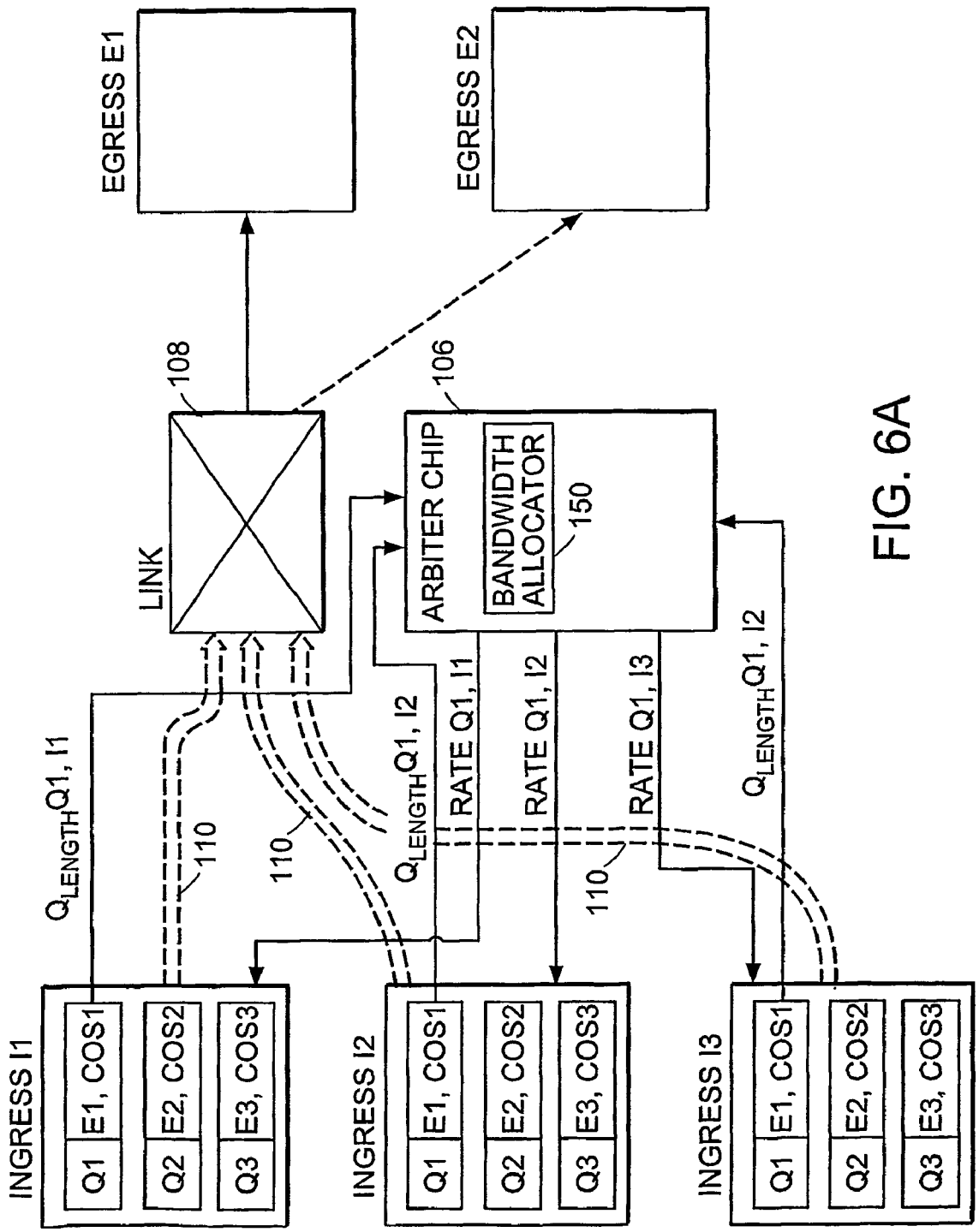
FIG. 6A is a block diagram illustrating one embodiment of bandwidth allocation at a single egress.

FIG. 6A exemplifies one embodiment of guaranteeing bandwidth for a particular egress E1. In such an embodiment, bandwidth for the single egress E1 is guaranteed so that packets from any of one or more ingresses I1, I2 can be transmitted to the egress E1. Ingress I1 of FIG. 6A contains three queues, queues Q1, Q2, Q3, and each queue is associated with a given COS and a given egress. For example, packets are, in this embodiment, buffered in queues depending not only on the COS for the packet, but also on the egress for which the packet is destined. Queue Q1 of FIG. 6A, for instance, is associated with egress E1 and has COS1. Queue Q2 is associated with egress E2 and has COS2, and queue Q3 is associated with egress E3 and has COS3. Ingress I2 and I3 are similarly set up with three queues Q1, Q2, Q3 having the same associations as the queues within ingress I1.

To calculate guaranteed rates in this embodiment of the invention, the queues associated with the same egress E1 and having the same COS communicate Qlengths to the bandwidth allocator module 150. In FIG. 6A, for example, queues Q1 in ingresses I1, I2, and I3 each communicate Qlengths to the bandwidth allocator module 150. Guaranteed rates for these three queues are then determined as a single subset or group. In order to determine the guaranteed rate for the queue, the guaranteed rate for queue Q in ingress i (that is, ingress I1, I2 or I3) destined for egress j (that is, egress E1, E2 or E3) is denoted as $g^i_{j,q}$. This rate $g^i_{j,q}$ can change with time. The method can guarantee bandwidth for an egress link by guaranteeing, for some egress j, bandwidth equaling $F_{j,q}=\Sigma_i$: inputs $g^i_{j,q}(t)$ averaged over a period of time. In this example, i can vary over all ingresses or over a subset of ingresses. Each $g^i_{j,q}(t)$ corresponds to the bandwidth allocated at time t to an associated queue Q with data destined for egress j, and including each queue Q, if any, in each of ingresses i. The system guarantees that $F_{j,q}$ worth of egress bandwidth which, at any given time, will be distributed over the different ingresses (that is, allocated to the queues Q within each ingress).

The Qlength for a queue Q in ingress i and destined for egress j can be denoted as $L^i_{j,q}(t)$. The values of these Qlengths are periodically communicated to the bandwidth allocator module 150. If $F_{j,q}$ is the bandwidth guaranteed at egress j for the COS corresponding to queue Q, then the guaranteed rates $g^i_{j,q}(t)$s can be initially set to be $F_{j,q}/N$, where N is the number of ingresses having such a queue Q (in this embodiment, there is one queue within each ingress bound for the egress and having the COS, although in other embodiments more than one queue Q with data bound for the egress and having the COS can be used). The guaranteed rates $g^i_{j,q}(t)$s can be reset or re-calculated depending on Qlengths $L^i_{j,q}(t)$ measured in subsequent timeslots as follows:

$$g^i_{j,q}(t) = \frac{(L^i_{j,q}(t) \times F_{j,q})}{\Sigma_{k:\ inputs} L^k_{j,q}(t)} \text{ for all } i$$

The inputs in this example are the number of ingresses N. If $\Sigma E_{k:\ inputs} L^k_{j,q}(t)$ is 0 (that is, all queues Q are empty), the guaranteed rates $g^i_{j,q}(t)$s are set to $F_{j,q}/N$ for all ingresses i having a queue Q. Each updated guaranteed rate $g^i_{j,q}(t)$ is then communicated back to the corresponding ingress i. In a hardware embodiment, the rate registers for queues Q are then updated. In a software embodiment, guaranteed rate variables $g^i_{j,q}(t)$ for the queues Q are updated.

As a particular example using the embodiment of FIG. 6A, assume the Qlength $L^i_{j,q}(t)$ for queue Q1 in ingress I1 is 200 bytes, the bandwidth rate $F_{j,q}$ for the egress is 0.2 Gbps, and there are three ingresses with queues having a total Qlength $\Sigma_{k:\ inputs} L^k_{j,q}(t)$ equaling 2000 bytes. In this example, the guaranteed rate $g^i_{j,q}(t)$ for the queue Q1 is:

$$g^i_{j,q}(t) = \frac{(200 \text{ bytes} * 0.2 \text{ Gbps})}{2000 \text{ bytes}} = 0.02 \text{ Gbps}.$$

FIG. 5 depicts an act of setting the guaranteed rates to equal values in block 506 for each ingress if the $\Sigma_{k:\ inputs} L^k_{j,q}(t)$ is 0 as tested at block 504. Block 508 depicts an act of setting the guaranteed rates to an individual calculated value for each ingress if $\Sigma_{k:\ inputs} L^k_{j,q}(t)$ is not 0.

Figure 6B:
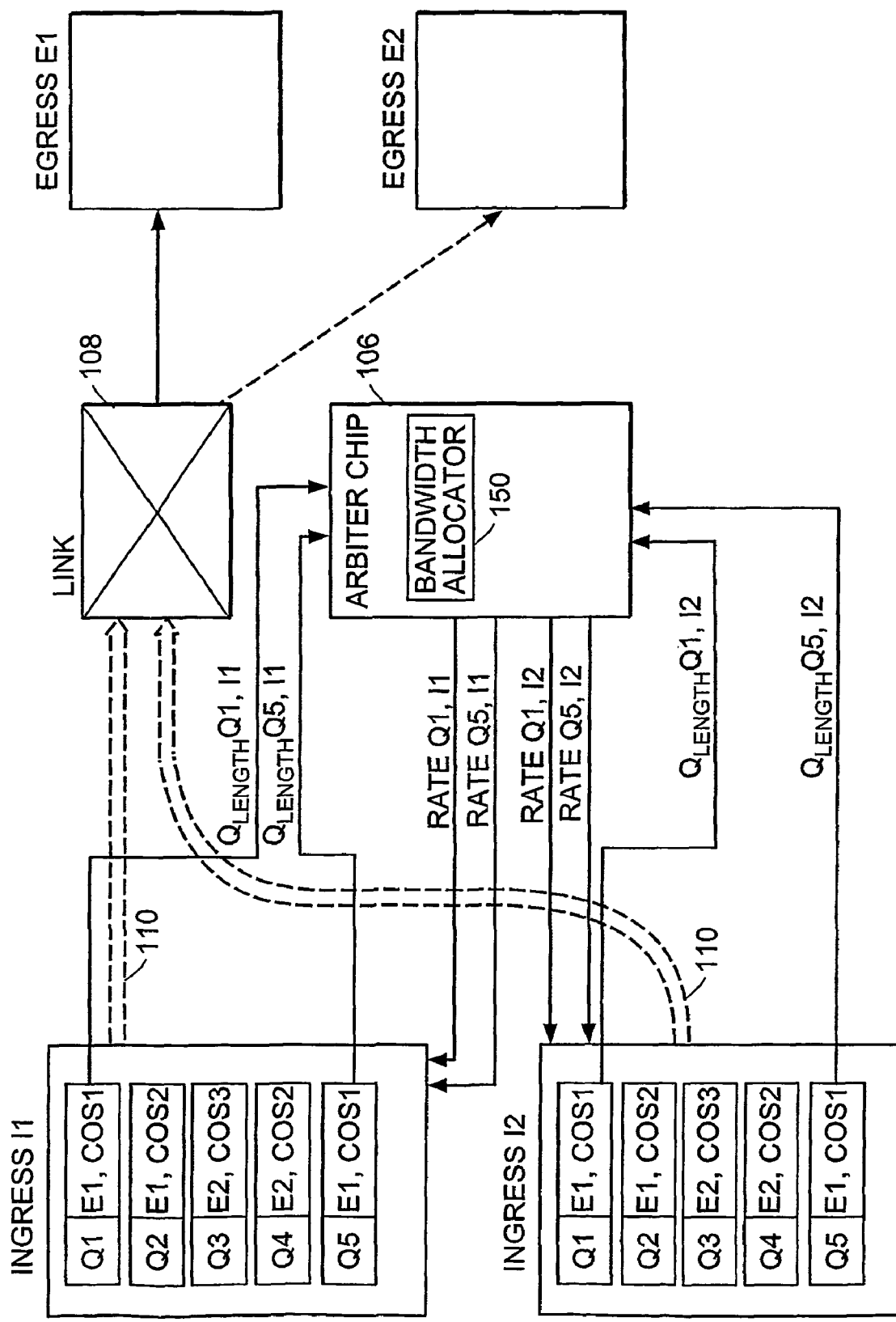
FIG. 6B is a block diagram illustrating a second embodiment of bandwidth allocation at a single egress.

In an alternative embodiment, depicted in FIG. 6B, more than one queue within each ingress has a given COS and has data bound for the same egress. Queue Q1 of FIG. 6B, for instance, is associated with egress E1 and has COS1. Queue Q5 is a second queue within ingress I1 that is associated with egress E1 and has COS1. Ingress I2 is similarly set up with five queues Q1, Q2, Q3, Q4, Q5 having the same associations as the queues within ingress I1. In such a case, the number N above will be the number of queues having a given COS and being bound for the same egress. For instance, in FIG. 6B, four queues have COS1 and are bound for egress E1 (two in ingress I1 and two in ingress I2). In such an embodiment, N=4 (the number of queues having the desired parameters) and not N=2 (the number of ingresses).

FIG. 6B also shows that an ingress I1, I2 can have queues with packets bound for the same egress, but having different COSs. FIG. 6B, for instance, shows that queue Q1 and queue Q2 are both bound for (have pockets destined for) egress E1, but have different COSs—COS1 for queue Q1 and COS2 for queue Q2. Only information from queues having the same COS is used in the calculations above. The number N of inputs in the calculations ($\Sigma_{k:inputs} L^k_{j,q}(t)$) for queues destined for egress E1, with COS1, in FIG. 6B, is therefore 4—i.e., queues Q1 and Q5 in each of ingresses I1 and I2. Queue Q2 in each ingress I1, I2 is not used for the calculations above due to the different COS. The egress output bandwidth $F_{j,q}$ is therefore associated with COS1 as well, and a separate egress output bandwidth amount can be associated with COS2.

The methods discussed above used Qlengths in order to calculate guaranteed rates. It should be noted that arrival rates can also be used to calculate guaranteed rates. In such an embodiment, arrival rate variables would be substituted in the equations and calculations above for Qlength variables in order to calculate guaranteed rates. Arrival rate information can be sent from the queue manager 112 (FIG. 3A) to the arbiter chip 106 in such an embodiment.

3. Guaranteeing Bandwidth at an Ingress

Figure 7A:
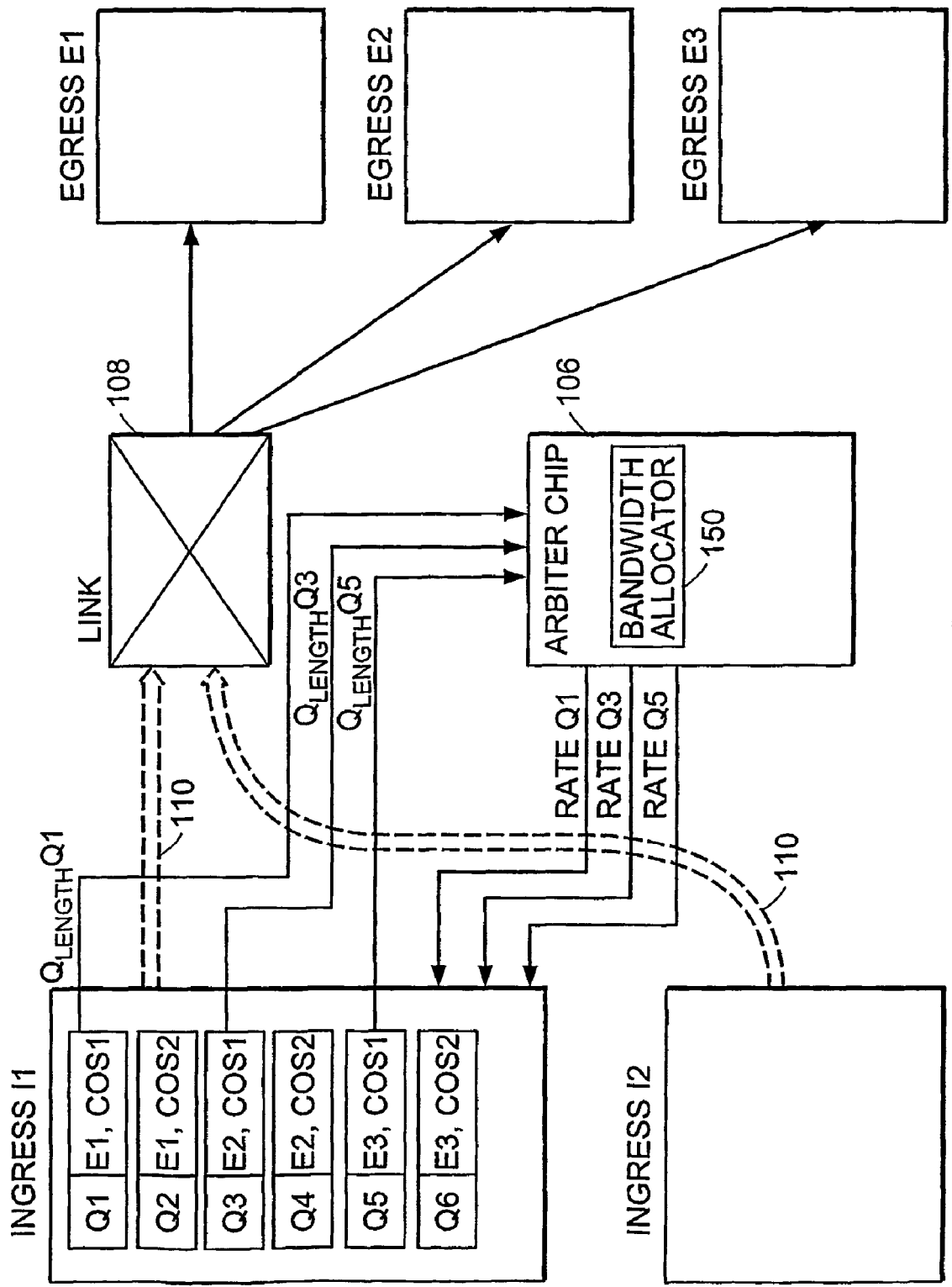
FIG. 7A is a block diagram illustrating one embodiment of bandwidth allocation at a single ingress.

FIG. 7A exemplifies one embodiment of guaranteeing bandwidth for a particular ingress I1. In such an embodiment, bandwidth for the single ingress I1 is guaranteed so that packets from the queues within ingress I1 can be communicated to any of the egresses E1, E2, E3. Ingress I1 of FIG. 7A contains six queues, queues Q1, Q2, Q3, Q4, Q5, Q6, and each queue is associated with a given COS. Queue Q1 of FIG. 7A, for instance, is associated with COS1. Queue Q2 is associated with COS2, and so forth. In this embodiment of guaranteeing bandwidth, the queues Q1, Q2, Q3 of each ingress I1, I2, I3 need not be associated with a single egress. For instance, queue Q1 having COS1 can have packets destined for any egress of the system. FIG. 7A depicts a packet in queue Q1 that is bound for egress E1, but the next packet in queue Q1 could be destined for a different egress. In another embodiment, however, a queue Q may be associated with a given egress so that all of the packets buffered in the queue Q are destined for that egress.

In this embodiment, the system and method guarantee bandwidth for a particular ingress. In this case, bandwidth equaling $E^i_q = \Sigma_{j:outputs} g^i_{j,q}(t)$ averaged over some time t is guaranteed for the ingress i (or a subset of queues within the ingress having a given COS). In this embodiment, bandwidth equaling $E^i_q$ is guaranteed for an ingress and such bandwidth $E^i_q$ can be distributed uniformly or non-uniformly over the different egresses j. The guaranteed rates $g^i_{j,q}(t)$s for the corresponding queues cannot be set to be constants which sum $E^i_q$, because at any given time, a particular queue may or may not have packets of data that are destined for an egress. In FIG. 7A, queues Q1, Q3, and Q5, which all have COS1, send Qlengths to the bandwidth allocator module 150, and rates for each of these queues are then determined as a group or subset and sent back to the ingress I1.

In this embodiment, guaranteed rates are set based on Qlengths, as in the egress bandwidth embodiment. The Qlength $L^i_{j,q}(t)$ is determined for each queue Q in a given COS corresponding to egress j in a given ingress I1. In this embodiment, each of these $L^i_{j,q}(t)$s can be locally available within a single ingress, unlike in the method for guaranteeing egress bandwidth. The guaranteed rates $g^i_{j,q}(t)$s can be initialized to $E^i_q/M$, where M is the number of queues having the given COS. In one embodiment, multiple queues within a single ingress can exist that are each associated with a given egress and have a given COS. In another embodiment, only a single queue Q can exist within an ingress that is associated with a given egress and has a given COS. In still other embodiments, the queues within an ingress can each have an associated COS, but the queues may not be associated with a particular egress. In any event, the guaranteed rates $g^i_{j,q}(t)$s can be reset or calculated depending on Qlengths $L^i_{j,q}(t)$ in subsequent timeslots as follows:

$$g^i_{j,q}(t) = \frac{(L^i_{j,q}(t) \times E^i_q)}{\Sigma_{k:outputs} L^i_{k,q}(t)} \text{ for all } j$$

If $\Sigma_{k:outputs} L^i_{k,q}(t)$ is 0, $g^i_{j,q}(t)$ is set to $E^i_q/M$ for all of the queues. Each updated guaranteed rate $g^i_{j,q}(t)$ is then communicated back to the corresponding ingress i. In a hardware embodiment, the rate registers for the queues Q are then updated. In a software embodiment, guaranteed rate variables $g^i_{j,q}(t)$ for the queues Q are updated.

As a particular example, for the embodiment of FIG. 7A, assume the Qlength $L^i_{j,q}(t)$ is 100 bytes, the bandwidth rate for the ingress is 0.5 Gbps, and the three queues having COS1 in ingress I1 have a total Qlength $\Sigma_{k:inputs} L^k_{j,q}(t)$ equaling 1000 bytes. In this example, the guaranteed rate $g^i_{j,q}(t)$ for the queue Q is:

$$g^i_{j,q}(t) = \frac{(100 \text{ bytes} * 0.5 \text{ Gbps})}{1000 \text{ bytes}} = 0.05 \text{ Gbps.}$$

In this example using FIG. 7A, ingress I1 has three queues Q1, Q3, Q5 having COS1, although each queue Q1, Q3, Q5 is associated with a different egress. Queue Q1, for instance, is associated with egress E1, and queue Q3 is associated with egress E2. In another embodiment, however, ingress I1 could have multiple queues having the same COS and being associated with the same egress. In still another embodiment, the queues within ingress I1 may not be associated with a particular egress, but may have an associated COS.

FIG. 5 depicts an act of setting the guaranteed rates to equal values in block 512 for each egress if the $\Sigma_{k:output} L^i_{k,q}(t)$, tested at block 510, is 0. Block 514 depicts an act of setting the guaranteed rates to an individual calculated value for each queue if $\Sigma_{k:outputs} L^i_{k,q}(t)$ is not 0.

The methods discussed above used Qlengths in order to calculate guaranteed rates. It should be noted that arrival rates can also be used to calculate guaranteed rates. In such an embodiment, arrival rate variables would be substituted in the equations and calculations above for Qlength variables in order to calculate guaranteed rates. Arrival rate information can be sent from the queue manager 112 (FIG. 3A) to the arbiter chip 106 in such an embodiment.

4. Guaranteeing Bandwidth for a Group of Queues

Figure 7B:
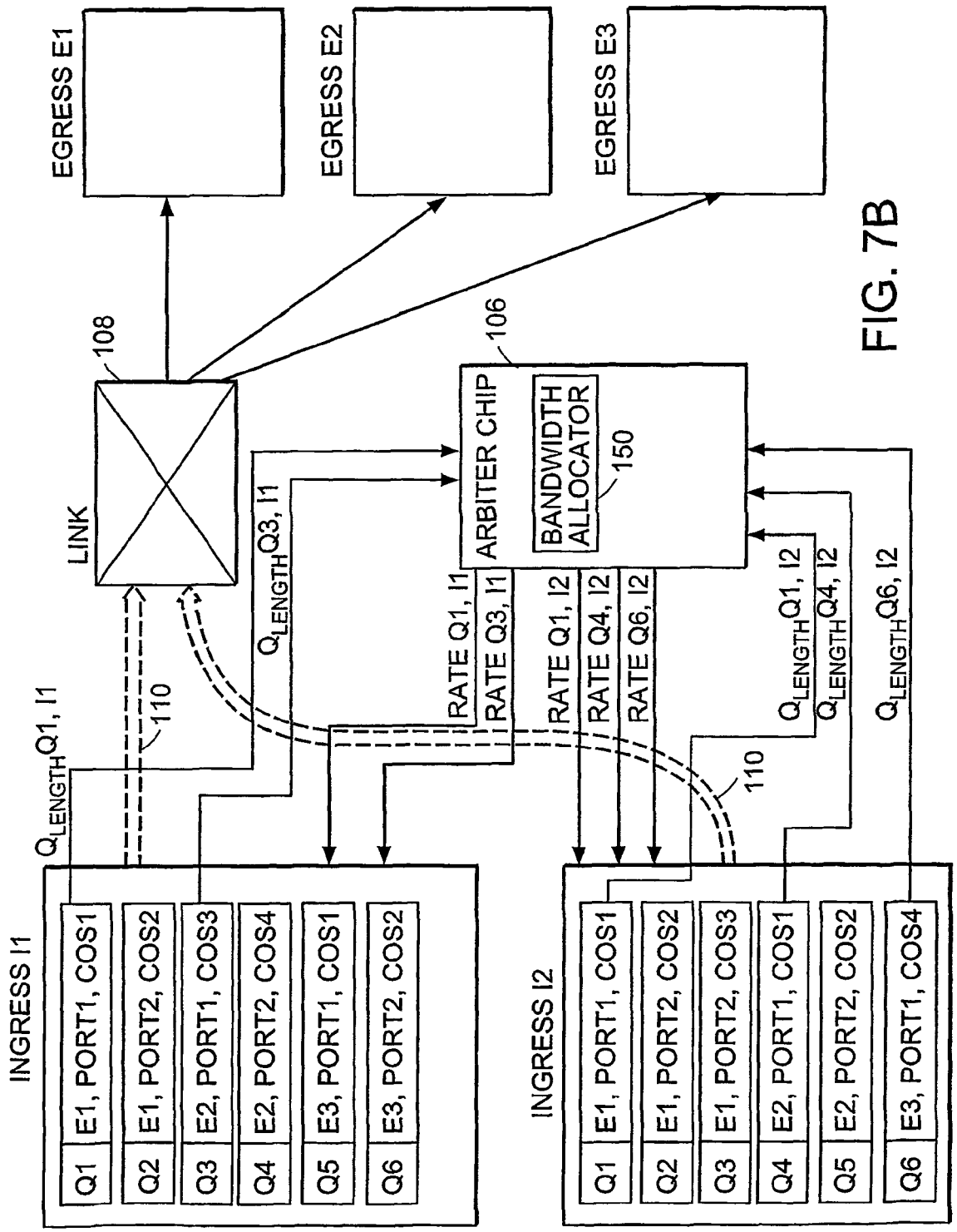
FIG. 7B is a block diagram illustrating one embodiment of bandwidth allocation for a group of queues.

FIG. 7B exemplifies one embodiment of guaranteeing bandwidth for a group of queues, which can be any arbitrary group of queues. In such an embodiment, bandwidth can be guaranteed for a group of queues, where the queues can be in different ingresses and can have packets destined for different egresses. In addition, the queues in the group can have the same COS or different COSs. The total bandwidth amount can be apportioned to the queues based on the Qlengths of the queues or, in other embodiments, based on the arrival rate of data to the queues.

Referring to FIG. 7B as an example of this embodiment, a group of queues for which bandwidth is guaranteed includes queues Q1 and Q3 in ingress I1 and queues Q1, Q4, and Q6 in ingress I2. The queues in this group are not bound for the same egress and do not have the same COS. Queue Q1 in ingress I1, for example, contains data bound for port 1 of egress E1 and has COS1, and queue Q3 in ingress I1 contains data bound for port 1 of egress E2 and has COS3. Queue Q1 in ingress I2 contains data bound for port 1 of egress E1 and has COS1. Queues Q4 and Q6 in ingress I2, which are also in the group of queues, also have arbitrary characteristics in this embodiment.

To calculate guaranteed rates in this embodiment of the invention, the queues associated with the arbitrary group of queues communicate Qlengths to the bandwidth allocator module 150. In FIG. 7B, for example, queues Q1 and Q3 in ingress I1 and queues Q1, Q4, and Q6 in ingress I2 each communicate Qlengths to the bandwidth allocator module 150. Guaranteed rates for these five queues are then determined as a single subset or group. In order to determine the guaranteed rate for each queue, the guaranteed rate for queue Q in the group of N queues is denoted as $g^i_q$. This rate $g^i_q$ can change with time. The method can guarantee bandwidth for the group of queues by guaranteeing bandwidth equaling $F_{ARB} = \Sigma_{i: \text{ inputs}} g^i_q(t)$ averaged over a period of time. In this example, i varies over each of the queues in the group of N queues. Each $g^i_q(t)$ corresponds to the bandwidth allocated at time t to an associated queue Q. The system guarantees $F_{ARB}$ worth of bandwidth, which, at any given time, will be distributed over the different queues in the group of N queues.

The Qlength for a queue Q in the group of N queues can be denoted as $L^i_q(t)$. The values of these Qlengths are periodically communicated to the bandwidth allocator module 150. If $F_{ARB}$ is the bandwidth guaranteed for the group of N queues, then the guaranteed rates $g^i_q(t)$s can be initially set to be $F_{ARB}/N$, where N is the number of queues in the group of queues. The guaranteed rates $g^i_q(t)$s for each queue can be reset or re-calculated depending on Qlengths $L^i_q(t)$ measured in subsequent timeslots as follows:

$$g^i_q(t) = \frac{(L^i_q(t) \times F_{ARB})}{\Sigma_{i: \text{ inputs}} L^i_q(t)}$$

for each queue

The inputs in this example vary over the number N of queues in the group. If $\Sigma_{i:inputs} L^i_q(t)$ is 0 (that is, all queues Q in the group are empty), the guaranteed rates $g^i_q(t)$s are set to $F_{ARB}/N$ for all queues in the group. Each updated guaranteed rate $g^i_q(t)$ is then communicated back to the ingress corresponding to the queue, as depicted in FIG. 7B. In a hardware embodiment, the rate registers for queues Q are then updated. In a software embodiment, guaranteed rate variables $g^i_q(t)$ for the queues Q are updated.

As a particular example using the embodiment of FIG. 7B, assume the Qlength $L^i_q(t)$ for queue Q1 in ingress I1 is 800 bytes, the bandwidth rate $F_{ARB}$ for the group of queues is 0.8 Gbps, and there are five queues in the group having a total Qlength $\Sigma_{i: \text{ inputs}} L^i_q(t)$ equaling 2000 bytes. In this example, the guaranteed rate $g^i_q(t)$ for the queue Q1 in ingress I1 is:

$$g^i_q(t) = \frac{(800 \text{ bytes} * 0.8 \text{ Gbps})}{2000 \text{ bytes}} = 0.32 \text{ Gbps}.$$

The methods discussed above used Qlengths in order to calculate guaranteed rates. It should be noted that arrival rates can also be used to calculate guaranteed rates. In such an embodiment, arrival rate variables would be substituted in the equations and calculations above for Qlength variables in order to calculate guaranteed rates. Arrival rate information can be sent from the queue manager 112 (FIG. 3A) to the arbiter chip 106 in such an embodiment.

C. Methods for Updating Credit Values

Figure 8:
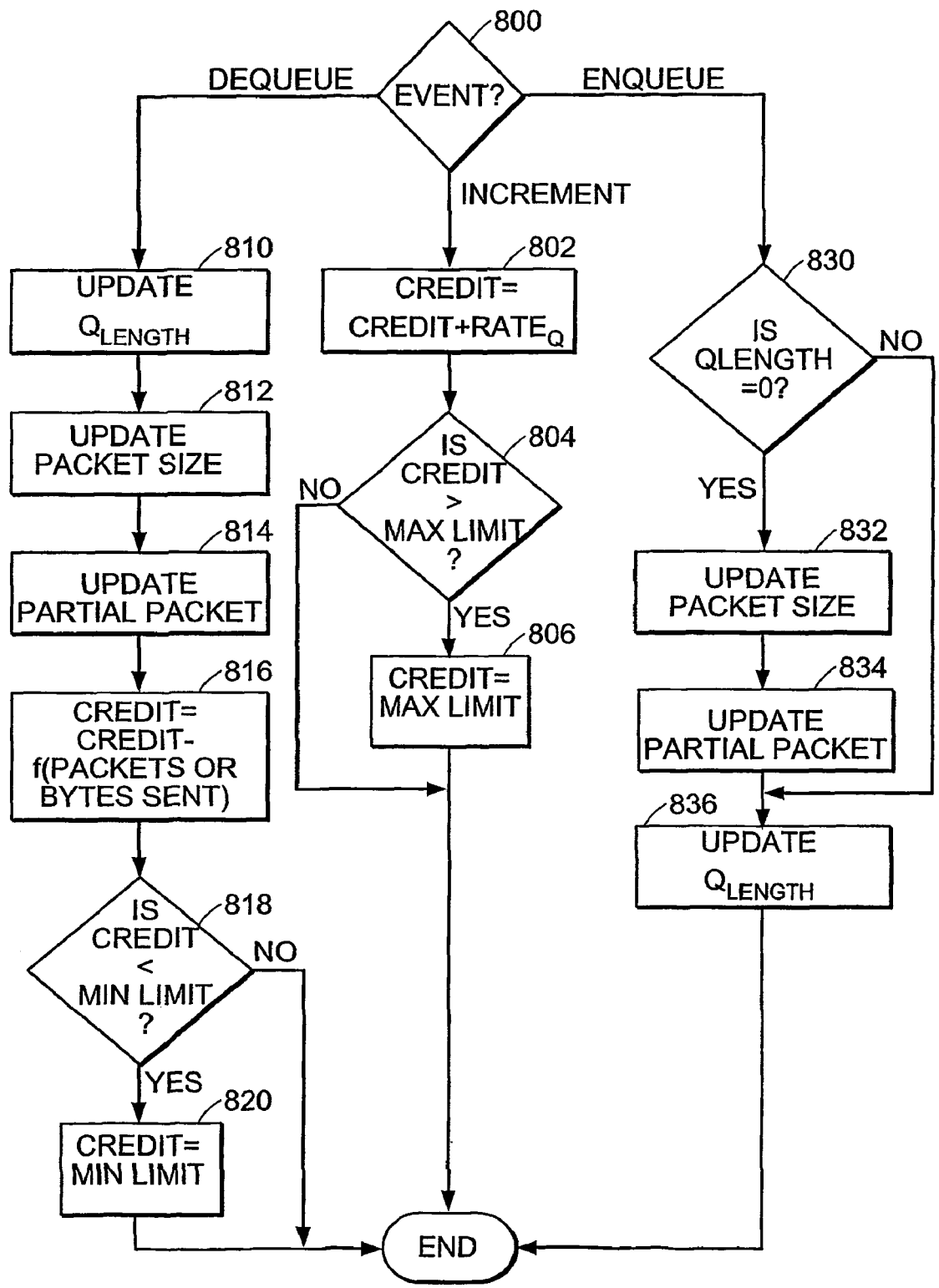
FIG. 8 is a flow chart showing the adjustment of credit values used for bandwidth allocation in one embodiment of the invention.

One method for updating credit values for a given queue is depicted in block form in FIG. 8 for one embodiment of the invention. As described above, credit values generally increase for queues that are not serviced after each timeslot, therefore increasing the priority for those queues. Similarly, a serviced queue has an associated credit value decreased after the timeslot in which it is serviced so that the priority for that queue will decrease. In one embodiment, an initial value of each credit value, before operation of the invention, can be 0. The credit values for each queue of an ingress are generally updated each timeslot. After a queue is serviced, therefore, the credit value can be decreased from its current value (initially 0, but after operation begins, the current value of the credit value can be a large positive number or a negative number of large magnitude). The credit values can be updated in the meter update module 160 of the metering module 154 using the guaranteed rates 52 for the queues received from the bandwidth allocator module 150. In a steady-state system, the credit values for all of the queues add up to 0, which indicates that the queues are, on average, receiving desired bandwidth rates.

FIG. 8 depicts three possible events 800 that can occur, in one embodiment of the invention, during a given timeslot for a single queue within an ingress. An enqueue event can take place, meaning that a packet of data enters the queue. A dequeue event can take place, meaning that the queue has been serviced and a packet has been sent from the queue to the shared link. The third event is an increment event, which takes place during each timeslot in this embodiment. During a single timeslot, each of the three events in FIG. 8 can occur for a queue. For an increment event in this embodiment, the credit value is incremented by adding the guaranteed rate for the queue to the current credit value, as denoted by block 802 in FIG. 8. As denoted by blocks 804 and 806, if the new credit value is greater than a maximum limit for the queue (which can be based on the COS for the queue), the credit value is reset to the maximum limit for the queue. In one embodiment, an increment event occurs during each timeslot, so that each queue is incremented after each timeslot by its associated credit value.

Maximum limits on the credit values for queues prevents the credit values for queues having low COSs from growing too large. The priority for these queues can therefore also be capped. This ensures that the queues having low COSs will not be serviced at the same rate as queues having larger COSs.

If an event is a dequeue event, in this embodiment, the Qlength for the queue becomes smaller, and the Qlength for the queue can therefore be updated, as denoted by block 810. A new packet or packets will be at the head of the queue for service, and the size of the packet or packets can be updated, as denoted by block 812. In addition, if the new packet is larger than a given timeslot, a partial packet variable will be updated, as denoted by block 814. The partial packet variable indicates that, once started, communication to the shared link 108 should be maintained for the queue so that a packet larger than a single timeslot can be transferred across the shared link 108 without interruption. The credit value for the queue can then be decreased, as indicated by block 816. In one embodiment, the credit value is decreased by a function of the number of packets sent (that is, if more than one packet is sent during a timeslot) or bytes sent during the timeslot. In another embodiment, the credit value can be decreased by the amount of data (that is, in bytes or bits) that can be sent in a single timeslot. As such, the credit value is appropriately decreased so that bandwidth can be re-allocated for the other queues. In this embodiment, an increment event will also occur after the timeslot, such that the credit value is decreased for the dequeue event by the number of bytes that can be sent during a single timeslot (for example), and then increased by the guaranteed rate for the queue for the increment event. If the updated credit value is smaller than a minimum limit for the queue, which can be based on the COS for the queue, as tested at block 818, the credit value is reset to the minimum limit for the queue at block 820.

A minimum credit value is used to insure that a priority for a queue having a certain COS does not become too small. This prevents the queue from not being serviced frequently enough.

If an event is an enqueue event, a determination is made whether the Qlength for the queue was indicated as being zero (block 830). If the current Qlength of the queue is zero, then no packet existed within the queue during the previous timeslot. Because a packet entered the queue during the enqueue event, the packet size for the queue will need to be updated along with the partial packet variable for the queue (blocks 832 and 834). If the Qlength is not zero, a packet exists at the head of the queue (and existed in the previous timeslot as well), and a packet size and partial packet variable were already set during a previous timeslot. Block 836 of FIG. 8 indicates an act of updating the Qlength based on the enqueued packet of data. An increment event can also occur during the same timeslot as an enqueue event, as may a dequeue event.

D. Methods for Determining Queue Priorities

After credit values are updated for the queues, a priority for each queue in each ingress indicating a need to connect to an egress can be determined. As described above and below in more detail, these priorities can be used to compute a mapping of the shared link 108 between ingresses and egresses.

In one embodiment, priorities for queues can be scaled on a sixteen point level between 0 and 15. In this embodiment, the priorities for queues are determined from the credit values for the queues on this scaled level. For instance, if the credit value for a given queue has accrued to the level of 1 Gbps, a priority for the queue can be set to a level of 5, and if the credit value for a second queue is 2 Gbps, a priority for the second queue can be set to a level of 10. In this embodiment, a negative credit value will be set to a low priority, such as 0 or 1. In such an embodiment, a queue having a greatest priority is the queue that will be serviced during a given timeslot. The conversion of credit values to priorities can minimize the amount of data that will be sent from an ingress 102 to the arbiter chip 106. A credit value, for instance, can be over 1,000,000,000 in size, while a corresponding priority for such a credit value can be 10. If a priority is scaled on a sixteen point scale, a four-bit register can be used for the priority in a hardware embodiment.

As described above in connection with updating credit values, credit values for certain queues can be limited depending on a COS for the queues. For example, a queue with COS1 can be limited to a certain minimum credit value that can correspond to a minimum priority level of 5 on a sixteen point scale. Similarly, a queue with COS8 can be limited to a certain maximum credit value that can correspond to a maximum priority level of 12 on a sixteen point scale.

In one embodiment using a sixteen point priority scale from 0 to 15, a priority of 0 is reserved for a queue that is empty and hence has no packet to transfer over the shared link 108. Similarly, a maximum priority of 15 can be reserved for partial packets. As explained above, if a packet is too large for transfer over the shared link 108 in a single timeslot, a partial packet variable is associated with the queue. When the queue having the packet eventually obtains a connection to the shared link 108, a maximum priority will be set for that queue in the next timeslot such that the queue will continue to be connected to the shared link 108 and the packet can be continuously transferred over the shared link 108 without segmentation and reassembly.

Table 1 below indicates another embodiment of the conversion from a credit value to a priority for a queue. In this embodiment, the conversion from a credit value to a priority can involve more than a simple scaling from a credit value to a priority. Other queue information, such as whether the queue is empty and whether the queue has been serviced too much, can also be considered. Table 1, therefore, includes a number of conditions along with a priority that can be assigned to a queue if one of those conditions is met. In this embodiment, each queue has a credit value $C(q)$ associated with it, as described above. The scaling factor S is a constant used to scale larger credit values into smaller priorities.

TABLE 1

| CONDITION | PRIORITY FOR QUEUE |
|---|---|
| 1. If the packet is a partial packet from the previous timeslot (that is, the queue has a partial packet variable associated with it). | MAXPRI |
| 2. If the queue is an expedited forwarding queue AND the credit value $C(q)$ for the queue is greater than 0. | MAXPRI - 1 |
| 3. If the queue is not an expedited forwarding queue AND the credit value $C(q)$ for the queue is greater than 0. | MIN [($C(q)$ / S), MAXPRI -1] |
| 4. If the queue is not empty AND if the condition below is not met, a minimum priority that can be set (that is, the priority can be larger as determined above). | 1 |
| 5. If the queue is empty, OR if $C(q) < S_{limit}$ | 0 |

As condition 1 in Table 1 indicates, in this embodiment, the priority for a queue is set to a maximum priority MAXPRI if the packet in the queue is a partial packet from the previous timeslot. On a sixteen point scale from 0 to 15, MAXPRI is 15. Such a partial packet that is assigned MAXPRI, in one embodiment, has a partial packet variable associated with it. Conversely, a queue that is empty is assigned a priority of 0, as condition 5 in Table 1 indicates. This is a minimum priority that will ensure that a queue having the priority of 0 will not be serviced during the given timeslot.

Condition 5 in Table 1 has a second condition that, if met, sets the priority to 0 (or a minimum priority). If the credit value $C(q)$ is less than a shaping limit $S_{limit}$ for the queue, the priority will be set to 0. The shaping limit $S_{limit}$ is a parameter used to scale the priority so that a queue doesn't receive too much bandwidth over a period of time. A guaranteed rate is, for instance, the minimum rate $F_{min}$ that a queue should receive. A maximum rate $F_{max}$, on the other hand, can be the maximum rate that a queue should receive. Of course, the bandwidth received over a discernable length of time greater than a single timeslot should be measured to determine if these rates are achieved. For instance, a time period of 50 microseconds can be the time period over which a minimum rate $F_{min}$ should be achieved and a maximum rate $F_{max}$ should not be exceeded. A time period of 50 microseconds can equal, for instance, 100 timeslots of 500 nanoseconds each. In this embodiment, the shaping limit $S_{limit}$ can be set to be:

$$S_{limit} = (F_{min} - F_{max}) * \text{time period}.$$

Because $F_{min}$ will be smaller than $F_{max}$, the shaping limit $S_{limit}$ will generally be a negative number. A credit value becomes negative only when its queue has been serviced recently and the queue, therefore, has already received more than its guaranteed bandwidth at that point in time. The larger in magnitude that a negative credit value becomes, the more the corresponding queue has been serviced, and the more that queue has exceeded its guaranteed bandwidth. In such cases, the priority for the queue can be forced to be 0 by using the shaping limit $S_{limit}$, as indicated in condition 5 in Table 1. If the credit value $C(q)$, converted to bytes per time period, is less than the shaping limit $S_{limit}$, the priority will be set to 0 in this embodiment, thus ensuring that the queue will not be serviced in a subsequent timeslot. If the converted credit value $C(q)$ is less than the shaping limit $S_{limit}$, the queue has already exceeded the maximum bandwidth that will be allowed over the time period, and hence the priority will be set to 0. In this manner, the maximum bandwidth that can be achieved for a queue can be restricted over a certain time period. If, however, it is desired to allow a queue to exceed its maximum bandwidth over a period of time, the credit value for the queue can be periodically set to 0 so that a negative credit value that is large in magnitude will not keep the queue from being serviced frequently.

With regarding to condition 2 in Table 1, an ingress can be set up with a queue that is an expedited forwarding queue. Such a queue is a queue that is serviced before other queues of the ingress regardless of credit value. An expedited forwarding queue can be used in an ingress to ensure that certain packets are transferred as quickly as possible. In such a case, the packet will be buffered in the expedited forwarding queue. As Table 1 indicates for condition 2, a priority of MAXPRI-1 is set to such an expedited forwarding queue if it contains a packet (that is, if the queue is not empty). A priority of MAXPRI-1 ensures that the queue will likely be serviced as long as no queue desiring the same egress has a priority of MAXPRI. Similarly, two queues may have MAXPRI-1, in which case a tie between the two queues will need to be broken, as described below. On a sixteen point scale from 0 to 15, MAXPRI-1 is 14.

Condition 3 in Table 1 indicates the typical condition in which the credit value is scaled into a priority. Generally, if a queue does not have a partial packet, the queue is not an expedited forwarding queue, and the credit value $C(q)$ for the queue is not negative, then the priority for the queue can be calculated by dividing the credit value $C(q)$ for the queue by the scaling factor S. The priority can be a rounded version of the credit value $C(q)$ divided by the scaling factor, so that a number of 6.4 would be rounded to a priority of 6. The use of a scaling factor S implies a linear scaling. The scaling, however, need not be linear, but can be nonlinear as well. In addition, a look-up table or a series of "if, then" determinations can be used to determine a priority based on a credit value. In order to keep the priority within the bounds of an established scale (such as a 0 to 15 scale), the priority for the queue can be set to a maximum level of MAXPRI-1 if it does not contain a partial packet. Condition 3 in Table 1, therefore, indicates taking the smaller of MAXPRI-1 or $C(q)/S$ for the priority for such a queue.

Condition 4 in Table 1 indicates that a priority for a queue will be a minimum priority if the queue is not empty and if condition 5 does not apply (that is, the credit value $C(q)$ is not less than the shaping limit $S_{limit}$). Table 1 indicates this minimum priority as being 1. The priority for the queue can, of course, be larger if the credit value $C(q)$ is positive, as indicated by condition 3. If the queue is not empty and if condition 5 does not exist, however, condition 4 indicates that a minimum priority is set.

The credit value of a queue can vary widely. It could be as large as tens of millions or a negative quantity whose magnitude is tens of millions. As an example of the conversion from a credit value to a priority, assume the guaranteed rate for a queue is 0.0005 Gbps, or 500,000 bytes per second (bps). With each passing timeslot for which the queue is not serviced, therefore, the credit value associated with the queue increases by 500,000 bps. The scaling factor S, in this example, is 1,000,000. If the credit value for the queue grows to a value of 12,000,000, therefore, the priority for the queue will be set to 12 (assuming the queue is not an expedited forwarding queue and the queue does not contain a partial packet). If the credit value for the queue is—5,000,000, the priority for the queue will be set to 1 (unless condition 1, 2 or 5 applies from Table 1).

E. Methods for Queue Service Selection

Figure 9:
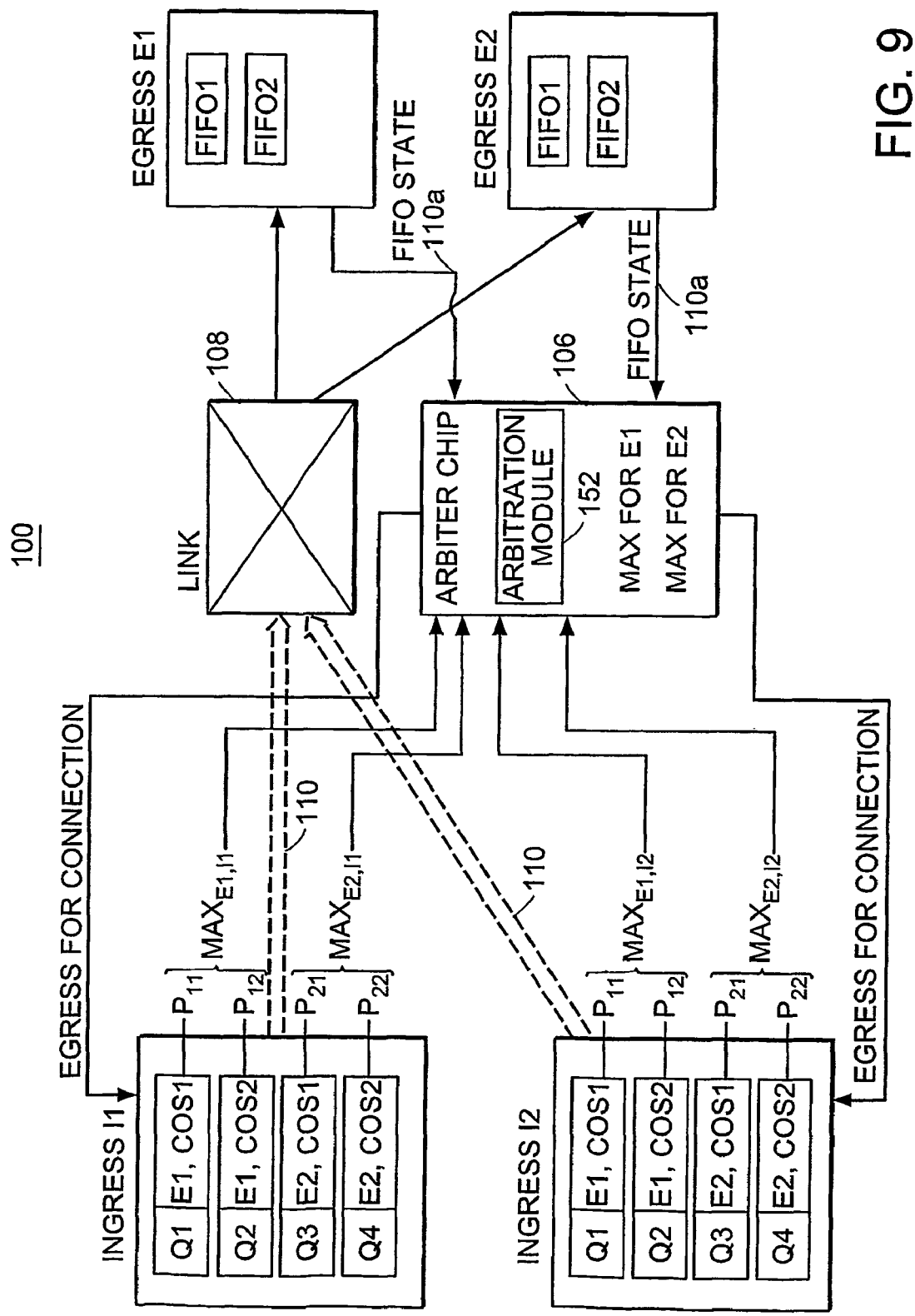
FIG. 9 is a block diagram illustrating one embodiment of a queue selection scheme of the invention.

After a priority for each queue has been determined, the plurality of priorities is used to compute a mapping over the shared link 108 between the ingresses and egresses for a timeslot. FIG. 9 illustrates one simplified embodiment of selecting queues for service during a given timeslot. FIG. 9 depicts two ingresses I1, I2, each of which has four queues. Depicted within each queue Q1, Q2, Q3, Q4 is a COS for the queue and a packet at the head of the queue. Each of the packets at the head of the queues contend for access to the shared link 108 during any given timeslot. In FIG. 9, for example, a packet destined for egress E1 is at the head of each queue Q1, a packet destined for egress E1 is also at the head of each queue Q2, and packets destined for egress E2 are at the head of each of queues Q3 and Q4.

FIG. 9 shows that priorities P11, P12, P21, and P22 have been computed for each of the queues Q1, Q2, Q3, Q4. In one embodiment, priority computation and queue selection take place every timeslot. At any given moment, therefore, a priority for a packet (or packets) at the head of a queue is akin to a priority for the queue itself because only the packet (or packets) at the head of the queue contends for access to the shared link 108 during a given timeslot. Throughout this specification, therefore, the instantaneous priority for a queue can be considered to be synonymous with a priority for a packet (or packets) at the head of the queue. In addition, a priority that is "instantaneous" refers to a priority for a given timeslot, which is an instant in time having some finite duration, and this priority may or may not change in timeslots that follow the given timeslot.

In FIG. 9, two ingresses I1 and I2, each having four queues Q1, Q2, Q3, Q4 are connectable to egresses E1 and E2 over the shared link 108. A two-level process for selection of a mapping between ingress and egress can be used as follows. In a first level, a first instantaneous priority is selected for each group of queues in each ingress bound for a particular egress. This first level of selection can be performed within an ingress by the priority computation module 156 (FIG. 3A). For ingress I1 in FIG. 9, for instance, queue Q1 and queue Q2 both contain packets bound for egress E1. Based on the priority of these two queues Q1, Q2, one of these queues, having a first priority, is selected. In one embodiment, for instance, the queue having the higher priority associated therewith is selected. Similarly, in ingress I2, queues Q1 and Q2 both contain packets bound for egress E1, and a queue having a first priority from these two queues is also selected. It is worth noting that for queue selection, the COS for the queue can, in one embodiment, be ignored. The COS for the queue has, presumably, already been used to determine the priority for the queue. FIG. 9 also depicts the selection of a queue (having a first priority) having a packet destined for egress E2 in each ingress I1, I2. An indication of the queue number, ingress number, and priority level for each selected queue having a first priority in the first level is sent to the arbitration module 152 of the arbiter chip 106, as depicted in FIG. 9.

The second level of the queue selection in the two-level process takes place within the arbitration module 152. In this second level, a queue having a second priority is selected from the subset of queues having the first priorities received from the ingresses I1, I2. This second level of selection reviews the priority with which each ingress desires to connect with each egress and selects an egress for each ingress. As an example, using FIG. 9, assume queue Q1 has a priority P11=12 in ingress I1 and is selected within ingress I1 in a first level of selection for egress E1. Similarly, assume queue Q2 has a priority P12=7 in ingress I2 and is selected within ingress I2 in a first level of selection for egress E1. These two queues, priorities, and desired egresses are communicated to the arbitration module 152. In the second level of queue selection, the arbitration module 152 selects from these queues (which both contain packets destined for egress E1) a queue having a second priority. In one embodiment, for instance, the queue having the highest priority is selected for the egress. In this example, for instance, queue Q1 from ingress I1 has a higher priority for egress E1 than does queue Q2 from ingress I2 (i.e., a priority of 12 is higher than a priority of 7). This second level, therefore, determines the egress to which each ingress is connected during a given timeslot.

A N×M matrix of priorities can therefore be used in the arbitration module 152, where N is the number of ingresses and M is the number of egresses. For instance, the arbitrator module 152 can receive from each ingress the maximum priority with which the ingress desires each egress, as determined in the first level of selection. These priorities then fill the N×M matrix so that an ingress can be selected for each egress in the second level of selection. As depicted in FIG. 9, a message is sent to each ingress notifying that ingress of the egress, if any, to which it will have access during the timeslot. The ingress can then connect the queue it selected for the determined egress to the shared link 108 for packet transfer.

During the second level of queue selection, it should be noted that a single ingress can contain more than one queue having packets destined for different egresses and that have the highest priority for those egresses. Because, in some embodiments, a single queue of an ingress can only be connected to a single egress during a timeslot (a physical limitation in this embodiment of the invention), each of these queues will not be selected for access to the shared link 108. In such a situation, the queue having the highest priority is selected from the queues within the ingress and the egress for that queue is determined according to that highest priority. The ingress will then be unavailable for at least that timeslot for connection to other egresses, and the priorities from that ingress can be ignored for the remainder of the queue selections in the second level of selection for this timeslot. As an example from FIG. 9, assume queue Q1 from ingress I1 has priority P11=12 and is the highest priority for egress E1 for all of the ingresses within the arbitration module 152. Further, assume queue Q3 from ingress I1 has priority P21=10 and is the highest priority for egress E2 for all of the ingresses. In this example, queue Q1 from ingress I1 has a greater priority than queue Q3 from ingress I1 (12 is greater than 10), and hence queue Q1 from ingress I1 will be selected for access to egress E1. The remaining queues from ingress I1 will not be available for connection to the shared link 108 during that given timeslot. Queue Q3 from ingress I1 will therefore not be available for the given timeslot, and a different queue from a different ingress will have to be selected for egress E2.

A tie-breaking method may be needed when two or more priorities are equal in either an ingress or in the arbitration module 152. Such tie-breaking can be done using a random selection, a round robin selection or, in other embodiments, using the least recently serviced queue. As an example using FIG. 9, assume queue Q1 within ingress I1 has priority P11=10 for egress E1 and queue Q2 within ingress I1 also has priority P12=10 for egress E1. In a tie-breaking procedure using a least recently serviced queue, the queue Q1 or Q2 that has been serviced least recently will be chosen. A similar procedure can be followed within the arbitration module 152 for tie-breaking of priorities from ingresses for egresses. In such a case, for instance, the ingress that has been least recently connected to the egress will be serviced or, in another embodiment, the queue from either ingress that has been least recently serviced will be selected.

FIG. 9 depicts a message containing the state of the FIFOs within each egress E1, E2 being sent over lines 110a to the arbiter chip 106. The state of the FIFOs, which can be an indication of how full the FIFOs of an egress are, can be used within the arbitration module 152 to map ingresses with egresses. A priority for a queue can be reduced if the FIFO within the egress to which the queue wishes to communicate is full. In other words, if the FIFO of an egress is full, no packet will be sent to that FIFO, and if all of the FIFOs of an egress are full, a packet will not be sent to the egress in the timeslot, and the priority of a queue having a packet desiring that egress will be correspondingly reduced so that the queue will not gain access to the shared link 108 during the next timeslot. In this embodiment, the priority for queues bound for an egress with full FIFOs can be reduced within the arbitration module 152 on the arbiter chip 106, although the FIFO states can also be sent to the ingresses in other embodiments. In another embodiment, priorities are not actually reduced for queues having packets bound for an egress with full FIFOs, but instead the FIFO state can simply be used to ensure that no packets are sent to the egress while the FIFOs of the egress are full. In other words, an egress with full FIFOs is disregarded, and a FIFO port of an egress that is full is also disregarded. In this embodiment, no ingress gains access to the egress with full FIFOs during the given timeslot.

Another embodiment for selecting the queue to service can involve a three-level process for selection of a mapping between ingress and egress. The three-level process of queue selection can be used where packets of data specify an egress and a port within the egress with which connection is desired. FIG. 9, for instance, depicts ports FIFO1 and FIF02 within each of egresses E1 and E2. Packets of data within the ingresses can each specify a particular egress and also a particular port within that egress with which communication is desired.

Figure 10:
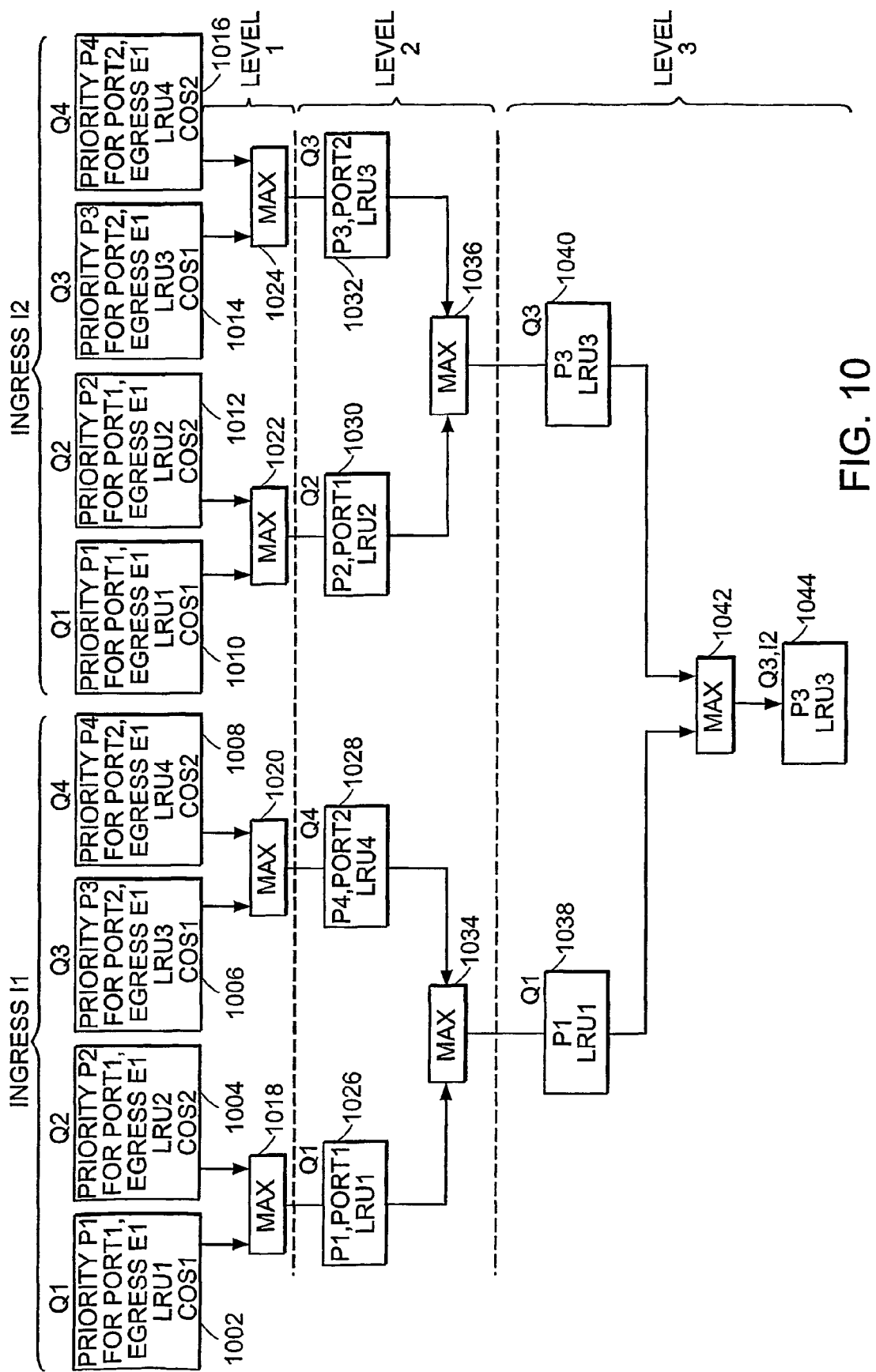
FIG. 10 is a flow chart illustrating a second embodiment of a queue selection method.

FIG. 10 is a decision tree block diagram illustrating levels of selection in a three-level process for queue selection. In the three-level process for queue selection, a first level of selection involves selecting, within each ingress, a queue from each group of queues bound for a particular port of a particular egress. In other words, a queue having a first priority is selected from those queues within an ingress bound for the same port of the same egress, and the first priority can be the highest priority for the group of queues. This selection can be from among queues having different COSs.

FIG. 10 depicts two ingresses I1, I2, each having four queues, with each queue in this depiction having packets bound for the same egress. Within ingress I1, for example, block 1002 indicates that queue Q1 has priority P1 and seeks to communicate with port 1 of egress E1. Similarly, block 1004 indicates that and queue Q2 has priority P2 and also seeks to connect with port 1 of egress E1. Note that queues Q1 and Q2 can have different COSs associated therewith. FIG. 10, for instance, depicts COS1 for queue Q1 and COS2 for queue Q2. In this example, queue Q1 or queue Q2 (which are both bound for the same port of the same egress) is selected in the first level of selection at block 1018. Specifically, in this embodiment, the queue having the highest priority is selected at this first level—queue Q1 in FIG. 10 (block 1026 shows this selection). FIG. 10 depicts a similar decision tree in which queue Q4 in ingress I1 is selected at block 1028 from between queue Q3 and queue Q4 (block 1020), both of which seek to communicate with port 2 of the same egress. A similar decision tree is depicted in FIG. 10 within ingress I2. Specifically, queues Q2 and Q3 are selected at blocks 1030 and 1032 in the first level within ingress I2.

A second level of selection in a three-level process involves selecting, within each ingress or within the arbitration module 152, a queue having a second priority from among the queues selected in the first level—that is, from the queues having first priorities. In other words, the second level involves selecting a queue for each ingress from those queues that seek to communicate with different ports of the same egress. If this second level is performed within the arbitration module 152, the fullness state of the FIFOs can be used so that a queue seeking connection to a full FIFO will not be selected. FIG. 10 shows for ingress I1 the selection in the first level of queue Q1 bound for port 1 (block 1026) and queue Q4 bound for port 2 (block 1028) of the same egress. The system then selects between these two queues in the second level at block 1034, based on the priorities of these queues, and FIG. 10 depicts the selection of queue Q1 bound for port 1 in this second level at block 1038. Specifically, queue Q1 is selected because priority P1 for queue Q1 is higher than priority P4 for queue Q4. Similarly, queue Q3 within ingress I2 is selected at block 1040 in the second level from a comparison between queue Q2 and queue Q3 at block 1036.

The third and final level of selection in a three-level process involves selecting an ingress (from queues having second priorities) for each egress such that no egress is connected to more than one ingress. Such a third level is performed in the arbitration module 152 and not within an ingress such that priorities with which each ingress desires each egress may be present. In other words, for each group of queues having second priorities and being bound for a particular egress, a queue is selected such that each egress is connected to only a single ingress. In one embodiment, the queue having the highest priority is selected.

Referring to FIG. 10, queue Q1 within ingress I1 and queue Q3 within ingress I2 were selected in the second level at blocks 1038 and 1040. A selection is made based on a comparison of the priorities (priority P1 and priority P3) of these two queues at block 1042. In FIG. 10, queue Q3 has been selected in this third level at block 1044. Because queue Q3 is within ingress I2, ingress I2 is connected to the egress in this embodiment, and queue Q3 is the queue that is serviced. It should be noted that FIG. 10 depicts a simplified procedure in which only two ingresses are present and all of the depicted queues are bound for the same egress. More generally, at the third level of selection, for instance, ingresses are selected for each of a plurality of egresses. Also, because a single ingress can have two or more queues with the highest priority for two or more egresses, the queue from this ingress having the highest priority will be chosen for communication to the egress, leaving the other queues within that ingress to contend for communication in subsequent timeslots.

FIG. 10 also shows the information that can be used to break a tie at any of the three levels of selection. Each queue of FIG. 10 has associated therewith a least recently used (LRU) number. The LRU number is a variable that indicates a length of time since the queue was last serviced or a scaled number that generally indicates how long the queue has gone since being serviced. The LRU number can also represent the position in a total ordering of the queues, where the ordering is based on increasing lengths of time since each queue was last serviced. For instance, queue Q1 of ingress I1 has LRU1 (block 1002) and queue Q2 has LRU2 (block 1004). If the priority P1 of queue Q1 is the same as the priority P2 of queue Q2 at block 1018, the LRU numbers can be used to break the tie in that level of selection. Thus, if a comparison between LRU1 from queue Q1 and LRU2 from queue Q2 in block 1018 indicates that queue Q1 has gone longer since being serviced, queue Q1 will be selected in the first level of selection. The LRU number can also be sent with each queue and priority selected in the second level from an ingress to the arbitration module 152 so that ties can be broken in the arbitration module 152 using the least recently used (LRU) information. The arbitration module 152 can also store its own LRU information regarding which egress port was selected and when each ingress was connected to each egress.

Figure 11:
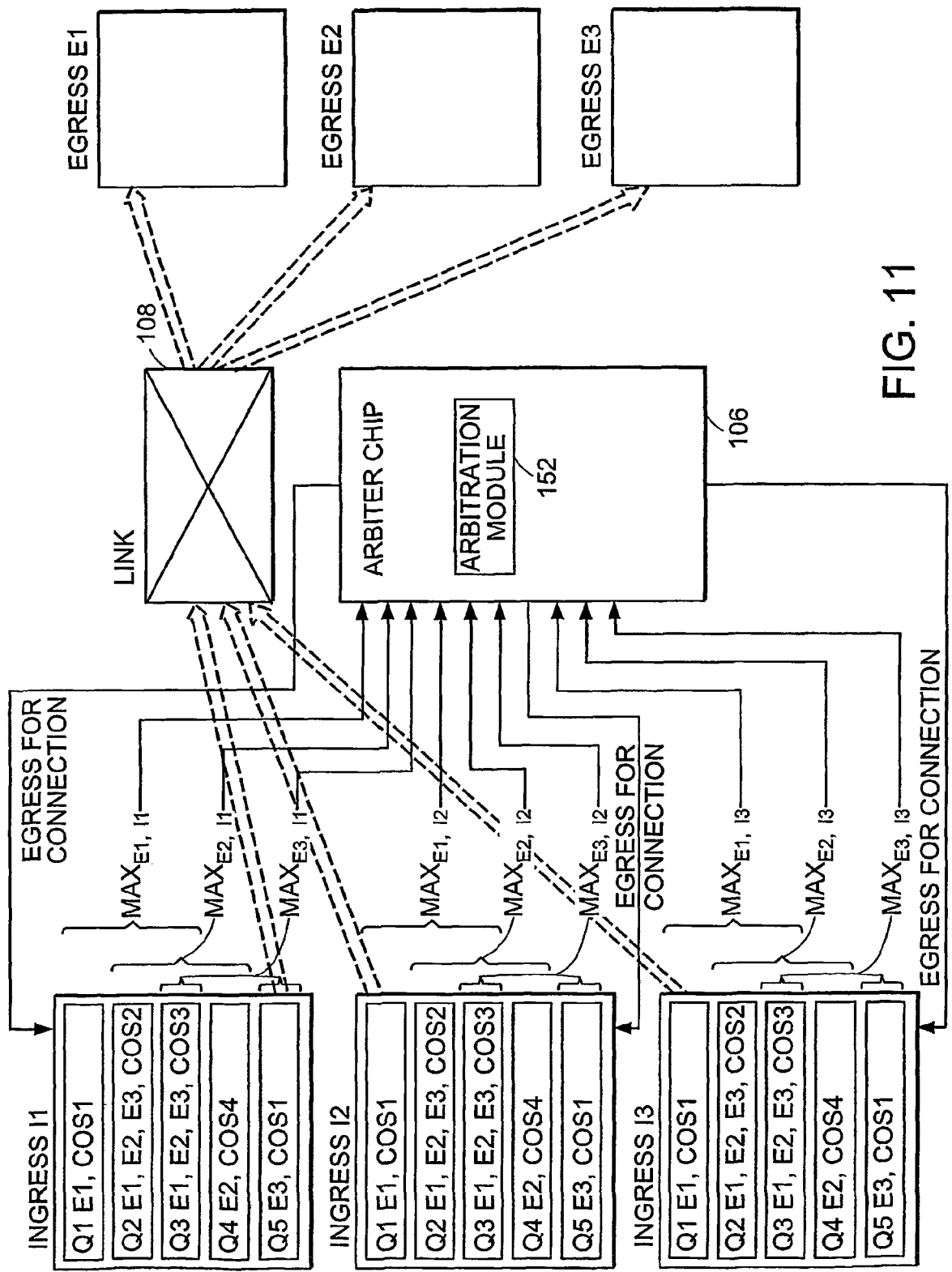
FIG. 11 is a block diagram of another embodiment of a queue selection scheme.

FIG. 11 illustrates another embodiment of a queue selection procedure using a block diagram of the system 100 in accordance with one embodiment of the invention. In this embodiment of the invention, a queue within an ingress can be reserved for packets that are bound for more than one egress. Such packets are referred to as "multicast" packets throughout this specification, and queues containing these packets can be referred to as "multicast" queues. Queue Q2 in each of ingresses I1, I2, and I3 in FIG. 11, for instance, is bound for egresses E1, E2, and E3. Packets queued in queue Q2, therefore, will be bound for two or more of egresses E1, E2, and E3. One packet in queue Q2 can be bound for egresses E1, E2, and E3, while another packet in queue Q2 can be bound for egresses E1 and E3. In the embodiment of FIG. 11, if a queue having a packet that is bound for more than one egress is selected for communication over the shared link 108, that queue can be connected to more than one egress during a single timeslot. The shared link 108, therefore, can map a single ingress in a timeslot to more than one egress in this embodiment. If the number of ingresses is the same as the number of egresses, at least one of the ingresses would not be connected to the shared link 108 in that timeslot.

The selection scheme can vary when multicast queues are used. In one embodiment, a queue in an ingress having multicast packets is only selected for communication across the shared link 108 when the queue has the maximum priority for each egress associated with the multicast queue. In such an embodiment, for instance, queue Q2 in ingress I1 of FIG. 11 can have the maximum priority for egress E1 and E2, and still not be selected for communication across the shared link 108 because queue Q2 does not have the maximum priority for egress E3. In another embodiment, only the packet at the head of the queue is reviewed to map ingresses to egresses. For instance, if queue Q2 in ingress I1 of FIG. 11 contains a packet at the head of the queue that is bound for only egresses E1 and E2, then queue Q2 will be selected if it has the maximum priority for egress E1 and E2 regardless of whether queue Q2's priority for egress E3 is the maximum priority. Another embodiment can be where a multicast queue is selected for information transfer if it has the maximum priority for only a single egress. This embodiment may, however, not use bandwidth efficiently because the queue would be selected for multiple egresses without having the maximum priority for each egress.

Referring to FIG. 11, an example of a queue selection scheme using multicast packets can be described. In FIG. 11, two or three rounds of selection can be used as described above in connection with FIGS. 9 and 10. In a three-level selection scheme, the first level of selection can be performed within each ingress, the second level can be performed within each ingress or within the arbitration module 152, and the third level of selection can be performed within the arbitration module 152. Each ingress I1, I2, I3 of FIG. 11 contains the same type of queues. Within each ingress, a first level of selection can choose a queue from each group of queues bound for a particular port of a particular egress. Within the arbitration module 152, a second level of selection can involve choosing a queue for each ingress from those queues that seek to communicate with different ports of the same egress. A third and final level of selection, performed within the arbitration module 152, can then involve selecting an ingress for each egress.

FIG. 11 depicts a two-level selection scheme. For ingress I1 of FIG. 11, queues Q1, Q2, and Q3 can each contain packets bound for egress E1. A queue having a maximum priority is therefore chosen from these three queues. Similarly, queues Q2, Q3, and Q4 can contain packets bound for egress E2, and so a queue having a maximum priority is selected from these queues. In addition, queues Q3 and Q5 can contain packets destined for egress E3, and so a maximum priority is selected from these queues. Similar selections are performed for each of ingresses I2 and I3. The arbitration module 152 can then select an ingress for each egress. In one embodiment, for instance, ingress I1 can be selected for each of egress E1, E2, and E3. If this is the case, ingresses I1 and I2 will be idle during the given timeslot. Queue Q2 or Q3 in ingress I1 can therefore be connected to each of egresses E1, E2, and E3 in this embodiment. In a second embodiment, ingress I1 can be connected to egresses E1 and E2, ingress I2 can be idle, and ingress I3 can be connected to egress E3 during a given timeslot.

In one embodiment, a multicast queue can send the packet or packets to each of the queues with which it is associated when the multicast queue is selected for communication, regardless of whether the packet or packets are destined for each of the egresses. For instance, in FIG. 11, queue Q3 of ingress I2 can be selected for information transfer to each of the egresses E1, E2, and E3. One packet in queue Q3 of ingress I2, however, may only be bound for egresses E1 and E2. In one embodiment, this packet would be sent to each of the three egresses E1, E2, and E3, and then egress E3 would disregard the packet because the packet would not contain header information indicating that it belongs in egress E3.

F. Guaranteeing Bandwidth and Providing Overload Protection

1. Introduction

Another embodiment of the invention relates to an apparatus and method for efficiently scheduling the connection of ingresses to egresses across a shared link in a way that allows quality of service (QoS) requirements in the form of bandwidth guarantees to be met. This embodiment of the invention can guarantee bandwidth while providing overload protection.

Figure 1:
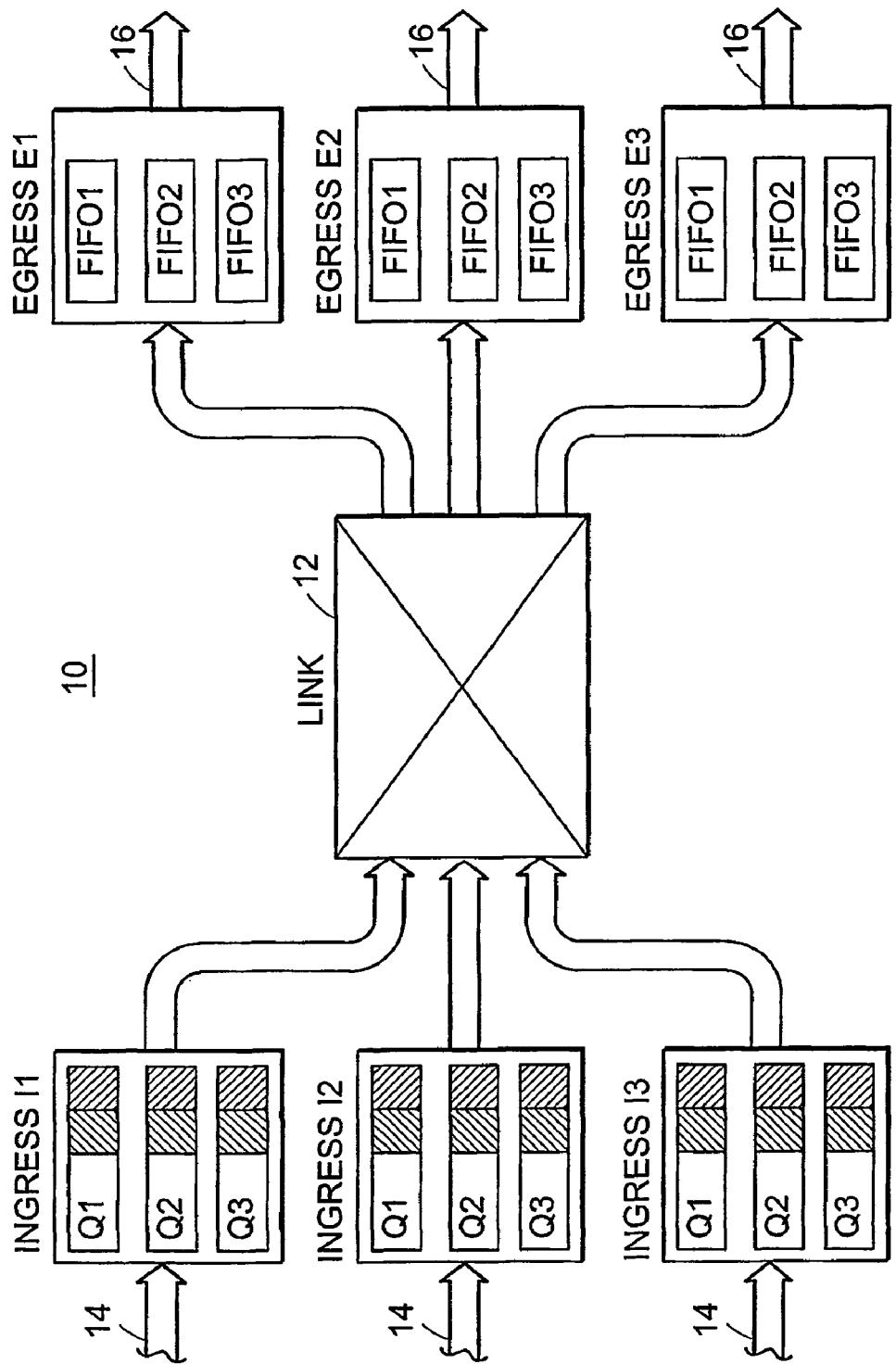
FIG. 1 is a block diagram of a prior art switching system.

Each ingress and egress link in a switching system, such as that shown in FIG. 1, has an associated line rate which determines the maximum rate at which packets can arrive and depart from the switching system. One problem in efficient switch scheduling is caused by egress contention. That is, multiple packets may arrive in the same timeslot at different ingresses, all of which need to be sent to the same egress. However, because of the crossbar constraint, at most one of these packets can be sent in any given timeslot to the commonly desired egress. Care must therefore be taken to avoid packet losses that might occur.

For practical operation, in particular at high-speeds, it can be desirable for the switch arbitration function to meet several goals. First, it needs to be fast, being able to match ingresses and egresses as quickly as possible. Second, it needs to ensure that the number of ingress-egress pairs matched in any timeslot is large, to avoid wasting link bandwidth. Third, it needs to ensure that any QoS (rate) guarantees made on queues in the system are met, even when the data arrivals overload the capacity of specific links of the switch. As an example of rate guarantees in FIG. 1, packets from ingress I1 bound for egress E1 might have a guaranteed rate of 8 Gigabits per second (Gbps), ingress I2 to egress E1 might have a guaranteed rate of 2 Gbps, ingress I2 to egress E3 might have a guaranteed rate of 5 Gbps, ingress I3 to egress E2 might have a guaranteed rate of 4 Gbps, and ingress I3 to egress E3 might have a guaranteed rate of 5 Gbps. These might be the guaranteed rates in a configuration where each ingress and egress has a maximum possible rate of 10 Gbps. This embodiment of the invention can be used to meet these goals.

Thus, this embodiment of the invention can be used to achieve QoS goals in the form of bandwidth guarantees. Bandwidth can be guaranteed to individual queues as well as to groups of queues. In addition, this embodiment of the invention can be used to protect against overload. It is desirable for switches to work well and meet bandwidth guarantees even when significant traffic overload occurs. Such traffic overload can occur, for example, due to denial-of-service (DoS) attacks, worm-triggered traffic floods, and traffic flash crowds to suddenly popular services.

Two types of solutions have been proposed to solve these problems while reducing the occurrence of packet losses. First, packets may be buffered at the ingress in order to avoid packet loss, and in each timeslot the set of ingresses with buffered packets for an egress compete for access to it. Second, the switch can employ speedup. A switch with speedup S allows up to S cells worth of bits to be transferred between an ingress and one or more egresses in the same timeslot. Many systems have a speedup of 2, i.e., the rate at which packets can flow through the switch is twice the line-rate. Fabric speedup need not be an integer, for example, it may be 1.5. The embodiments of the invention described below can be used to provide rate guarantees in the presence of overload for any speedup greater than or equal to 1.

Typically, there are per-egress queues at each ingress for packets destined to different egresses. This can avoid the "head-of-line (HOL) blocking" problem which could otherwise occur if a packet destined for one egress "blocks" transfer of other packets in the same queue. Virtual output queueing (VOQ) is the name given to setting up ingresses to have per-egress queues. For example, if there are three egresses in the system, each ingress can have three queues, with each queue containing packets destined for only one of the three egresses. It is also possible that there are several different queues at each ingress that contain packets destined for the same egress. This can be useful to implement different classes of service in QoS. Here, each queue having packets for the same egress contains packets of a given traffic class.

One significant factor in determining overall router cost and power dissipation is the memory capacity and bandwidth requirements for packet buffering. Packet buffer capacity typically increases linearly with link speeds—at multi-Gigabit speeds, on the order of several Gigabytes are required per link. Most current designs of network switches in data networks use some form of combined input/output queueing (CIOQ). Traditional CIOQ switches have large packet buffers at both the ingress and egress line cards. The two stages of buffering can increase cost and power consumption and also add to forwarding latency compared to a router with only one stage of buffering.

2. Embodiment for Guaranteeing Bandwidth and Providing Overload Protection

This embodiment of the invention relates to providing bandwidth guarantees and overload protection in a network switch in order to schedule the switch crossbar more judiciously than in conventional CIOQ switches. Rather than schedule the crossbar without regard to bandwidth requirements, information about whether queues have received their allocated bandwidth rates is considered. In addition, a dynamic tiered maximal matching strategy is used to match ingresses to egresses. This embodiment is a method and system for determining priorities of input queues and using these priorities for allocating bandwidth.

In general, this embodiment of the invention includes two parts. First, in each timeslot or for a subset of timeslots, the current state of each ingress VOQ (and therefore the current state of each ingress) is mapped to a tier. In other words, characteristics about the queue are used to assign the queue to a tier of queues. The number of tiers is typically equal to or greater than 2, and these tiers can be defined in different ways as explained in greater detail below. Second, in each timeslot, given a set of tiers of queues, this embodiment of the invention produces a per-tier maximal matching. That is, if there are R (a number greater than or equal to 2) tiers, the invention starts at the highest tier and produces a maximal matching between ingresses and egresses considering only those VOQs that are in this tier. Then, from among the remaining unmatched ingress-egress VOQs, this embodiment produces a maximal matching at the next lower tier (R-1), and so on until all of the tiers have been considered or until there are no egresses available during the timeslot. In one embodiment, the first part—mapping the queues to tiers—is performed within each ingress chip, and the second part—matching the queues (and therefore the ingresses) to egresses—is performed within an arbiter chip.

Figure 12:
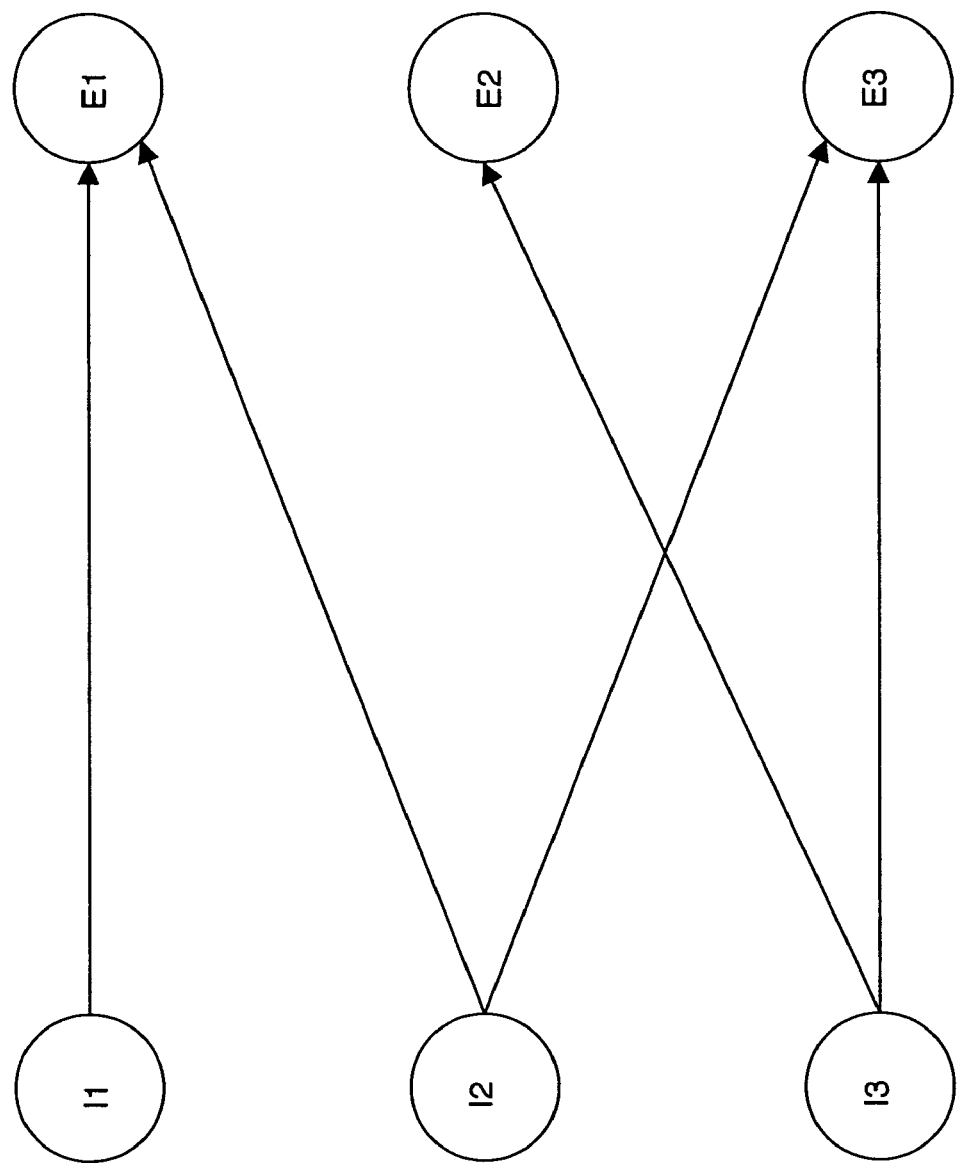
FIG. 12 is a block diagram illustrating an exemplary scenario in which the depicted ingresses have data to send to certain of the depicted egresses.

A matching of ingresses to egresses is maximal if no other ingress-egress pair can be added to the matching to produce a larger matching. For example, suppose in FIG. 12 the arrows from ingresses to egresses indicate which ingresses have data for which egresses. Thus, ingress I1 has data for only egress E1, ingress I2 has data for egresses E1 and E3 (but not E2), and ingress I3 has data for egress E2 and E3 (but not E1). If ingress I2 is matched to egress E3, ingress I3 is matched to egress E2, and ingress I1 is not matched, then this is not a maximal matching because the ingress-egress pair I1, E1 can be added to this matching to produce a larger matching. On the other hand, if ingress I1 is matched to egress E1 and ingress I3 is matched to egress E3, then this matching is a maximal matching because ingress I2 cannot be matched to egress E2 (it does not have data for egress E2).

The result of this tiered maximal matching strategy is a maximal matching of the entire switch. Thus, dynamic per-tier maximal matching can be used to provide bandwidth guarantees as well as overload protection by a proper dynamic assignment of VOQs to tiers. For example, referring to FIG. 2, if a queue at ingress I1 with data for egress E1 has not yet met its bandwidth guarantees, but a queue at ingress I3 with data for egress E1 has done so, then the queue at ingress I1 with data for egress E1 should be allowed to send data in preference to the queue from ingress I3. This notion of preference or importance between these queues is dynamic. That is, each queue transitions between states that correspond to the guarantees being met and not being met based on traffic arrivals, traffic service through the switch, and the bandwidth guarantees.

One way of grouping queues into tiers begins by having each ingress inform the arbiter (that is, the arbiter chip 106 of FIGS. 2 and 3A, or specifically the arbitration module 152 of the arbiter chip 106) of whether the allocated rates for each queue have not yet been met, in which case the queue is considered "hungry." If the allocated rate for a queue is being met, the queue is considered "satisfied." This is a simple example with exactly two tiers. This embodiment can use this allocated bandwidth information about the queues to assign the queues to tiers. After the queues have been assigned to tiers, the tiers are successively evaluated to produce a conflict-free matching of ingresses to egresses in each timeslot. The arbiter first does a maximal matching on the hungry queues, and then moves to the satisfied ones.

In more practical scenarios, more tiers than two as in the example above can be used to handle queues of a variety of types. For example, separate tiers can also be used for VOQs that contain "partial" packets that do not take up an entire timeslot, VOQs that require lower delay, or queues that are empty. Each queue can be dynamically assigned to a tier based on a variety of types of queue state information, such as but not limited to traffic arrivals to the queue, traffic service of the queue, bandwidth guarantees of the queue, delay requirements, and other queue state information. R tiers are predefined where R is greater than or equal to 2. The method operates by dynamically (e.g., at each time slot, or at each $k^{th}$ time slot, where $k>=1$) or statically classifying queues into these predefined tiers (depending on their characteristics).

Together, the two mechanisms of dynamic tier assignment and tiered maximal matching provide a matching of ingress-egress queue pairs such that bandwidth guarantees can be achieved even in the presence of traffic overload. Bandwidth guarantees can be made for any speedup $S>=1$. If the speedup is S, then S/2 times the ingress (egress) line rate worth of bandwidth can be guaranteed at each ingress (egress). Additional traffic of (1-S/2) times the line rate can be accommodated in best-effort fashion.

Figure 13:
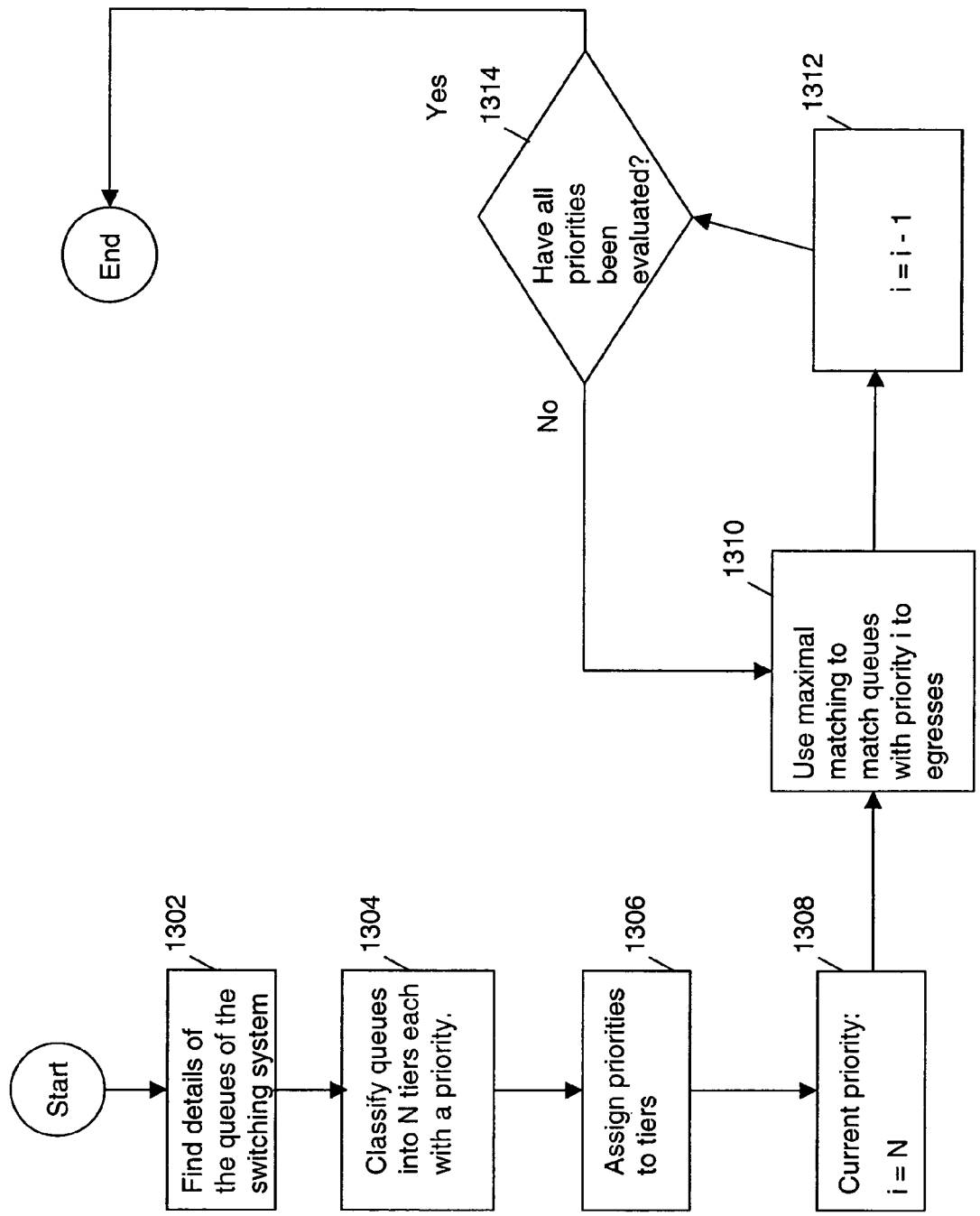
FIG. 13 is a flow chart illustrating another embodiment of the invention using dynamic per-tier maximal matching.

FIG. 13 is a flowchart that illustrates the working of one embodiment according to the invention. Generally, the two functions described above are performed—each queue is mapped to a tier, and per-tier maximal matching is performed. The combination of these two functions results in a maximal matching of queues (and therefore ingresses) with egresses.

Referring to FIG. 13, at step 1302, various characteristics (details) of the queues of switching system 100 (FIG. 2) are obtained. These characteristics can be gathered, for example, in an arbiter, such as the arbiter chip 106 of FIGS. 2 and 3A, or more specifically, the arbitration module 152 of the arbiter chip 106. In other embodiments, these characteristics can be gathered and analyzed within the ingress chip 102 in order to cut down and the amount of information sent to the arbiter chip 106. Some characteristics, or queue state information, that can be obtained at step 1302 are: (1) the length of each queue; (2) the guaranteed rate of each queue; (3) the credit value associated with each queue; and (4) the "age" of each queue. This list of characteristics of the queues is illustrative, and different additional types of characteristics can also be used within the context of the invention. In one embodiment, the arbiter need not be informed of queue state information for a queue if that information has not changed from information previously sent to the arbiter. In other words, only new or different queue state information is sent to the arbiter in this embodiment.

Referring again to FIG. 13, at block 1304, the queues are classified into "N" number of tiers, based on the above characteristics (which can be obtained at block 1302) or on any predetermined classifications. The number "N" of tiers is defined depending on the QoS guarantees that need to be made. In general, tiers are predefined in a manner discussed in greater detail below in connection with FIG. 15. For each timeslot, queues can be classified into the tiers. Thus, queues are dynamically assigned to tiers. For each timeslot, each queue can belong to one tier. Generally, the tiers are used to indicate which queues should be matched with egresses first—those in higher tiers will be matched with egresses before those in lower tiers. Thus, queues that need service more urgently than other queues can be classified into a higher tier for a given timeslot. After a queue is serviced, it can, in some embodiments, be classified into a lower tier so that it is not as likely to be serviced in the next timeslot. An exemplary division of queues into seven tiers is shown in FIG. 15, which is also described in greater detail below.

At block 1306 of FIG. 13, the tiers are assigned priorities, with each tier generally having a different priority. This priority is used to select queues during the matching of ingresses to egresses. The highest priority, which can have a value corresponding to the number of tiers "N," can be reserved for queues that are determined to belong to a "special" tier—i.e., a tier in which the queues require service for some reason. An example of such a reason is set forth above as a queue with a "partial" packet. All of the other tiers are assigned priorities lower than this highest priority. For example, an "expedited forwarding" tier may be associated with the second highest priority, which can have a value of "N-1". Each expedited forwarding queue is therefore assigned the priority "N-1," provided it is not empty. As detailed above in connection with Table 1, an ingress can be set up with a queue that is an expedited forwarding queue. Such a queue is a queue that is serviced before other queues of the ingress regardless of credit value. An expedited forwarding queue can be used in an ingress to ensure that certain packets are transferred as quickly as possible. In such a case, the packet will be buffered in the expedited forwarding queue. Empty queues are typically assigned priority "0," as may be queues that have exceeded their allocated bandwidth. As stated above, an exemplary division of queues into seven tiers is shown in FIG. 15, which is also described in greater detail below.

At block 1308 of FIG. 13, the value of a variable "i" is set to a value equaling the number "N" of tiers. This variable i is used, as set forth in FIG. 13 and described below, as a decremented counter so that maximal matching is performed for each of the "N" tiers.

At block 1310 of FIG. 13, the switching system 100 uses maximal matching to match queues with the current priority to egresses. In order to perform maximal matching, a queue to be evaluated is first selected. The queue in the tier to first be evaluated can be determined randomly, based on a predetermined order, probabilistically with a given weight, or using some other method. In one embodiment, random selection of the queue can be desirable in order to achieve better fairness of allocation. After selection of a queue within the tier, maximal matching tries to match (or connect) that queue (and therefore the ingress in which that queue is located) with the egress that is the queue's first choice for connection. If this is not possible, because the desired egress is already matched, for example, then another queue within the tier is selected and evaluated for connection to the egress that is that queue's first choice for connection. Similarly, this process continues until all of the queues at the given priority level (i.e., within the given tier) have been evaluated. Maximal matching is discussed in greater detail in connection with FIG. 14.

By maximally matching ingresses to egresses, this embodiment of the invention ensures that the match of a particular ingress to a particular egress in a timeslot is not done at the expense of a different match of that ingress or egress to another egress or ingress that might need the pairing more urgently in order for QoS guarantees to be met. Maximal matching is fast and does not require a great deal of processing power, so it can be implemented in switching systems without large expense.

At block 1312 of FIG. 13, the value of variable "i" (the current priority or tier level being evaluated for maximal matching) is decremented by one. At block 1314, the value of the variable i is checked to determine whether all of the priority levels have been evaluated. If all of the priority levels have been evaluated, then i=0, and execution of the flow in FIG. 13 ends and the matching of queues to egresses has been completed. If i>0, step 1310 is executed to perform maximal matching for the current priority (i.e., tier) level. This process is repeated until all of the priority levels (or tiers) have been evaluated.

Figure 14:
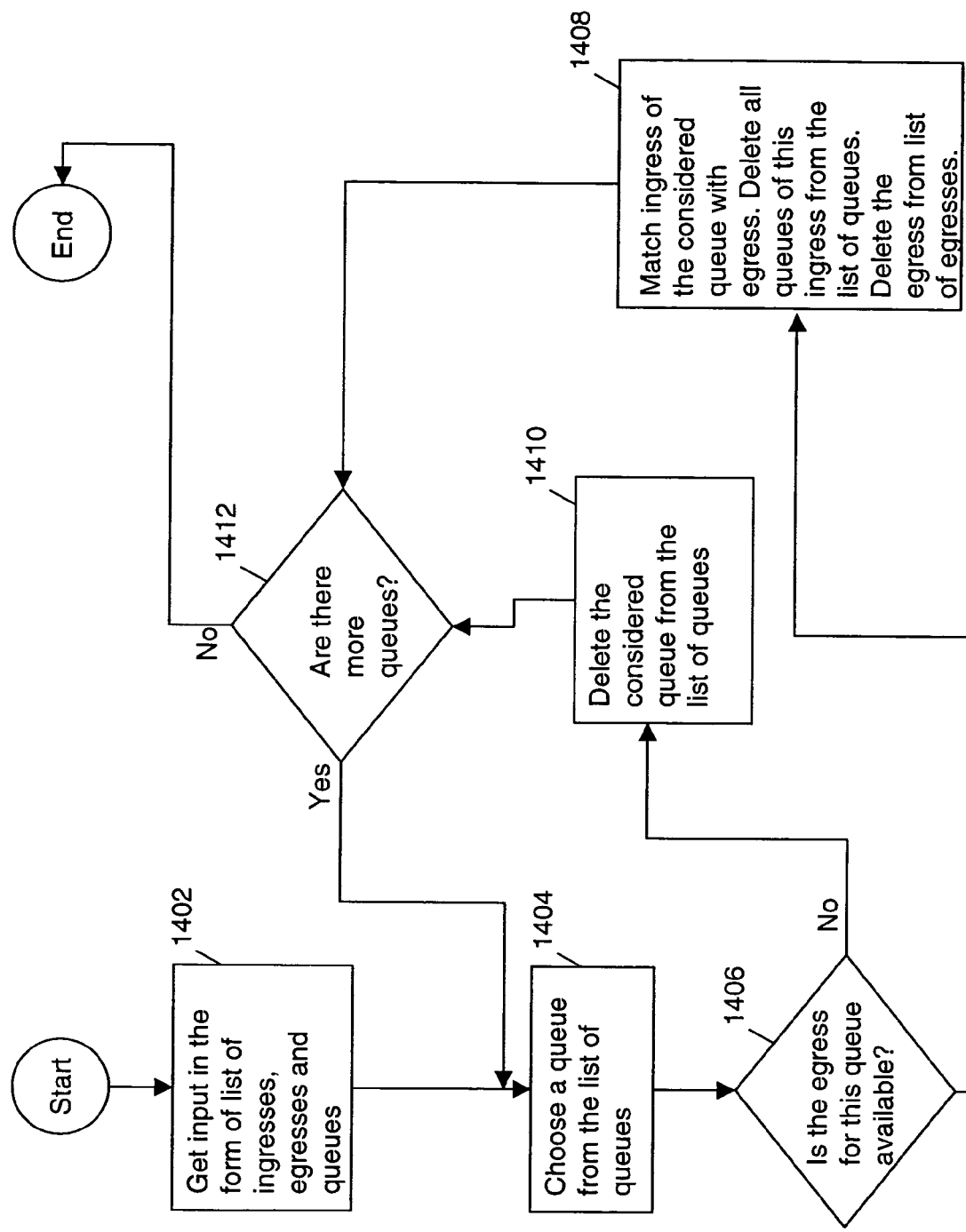
FIG. 14 is a flow chart illustrating one embodiment of maximal matching for a list of queues.

FIG. 14 is a flow chart that illustrates the working of maximal matching for a list of queues. This maximal matching procedure can be used at block 1310 of FIG. 13 to perform maximal matching. At block 1402 of FIG. 14, the process takes as inputs a list of available ingresses, a list of available egresses, and a list of queues that are to be considered for matching to egresses. The list of queues (and therefore the ingresses as well) consists of those queues within the priority level or tier that is currently being evaluated.

At block 1404 of FIG. 14, a queue is chosen from the list of queues to be considered. As set forth above, the queue in the tier to first be evaluated can be determined randomly, based on a predetermined order, probabilistically with a given weight, or using some other method. At block 1406, it is determined whether the desired egress is available for this queue. If there is an egress available, then block 1408 is executed. At block 1408, the ingress containing the queue under consideration is matched with the egress checked at block 1406. All of the queues of this ingress are then deleted from the list of queues available for matching. In addition, the egress that is matched to the queue is deleted from the list of egresses available for matching. Block 1412 is then performed.

If, at block 1406, an egress is not available for connection to the queue, block 1410 is executed. At block 1410, the queue under consideration is deleted from the list of queues to be matched. Block 1412 is then executed. In block 1412, it is determined whether there are additional queues within the tier being evaluated that are still available for matching. If there are no additional queues available for matching within the tier, execution of maximal matching ends for the given tier, and the process of FIG. 13 is followed (i.e., so that maximal matching can be performed for the next lower tier, if there is a lower tier). If there are more queues to be considered within the tier, block 1404 is executed and another queue is chosen from the list of queues to be considered. This process is continued until there are no additional queues to be considered within the tier.

FIG. 15 is a table that illustrates the classification of queues into seven tiers based on various properties or parameters in accordance with one embodiment of the present invention. The example of FIG. 15, including the description below, is one example of the classification of queues into a number "N" of tiers, as depicted above at block 1304 of FIG. 13. As set forth above, the tiers are used to determine different priority levels, which can be used to determine the order in which ingress to egress matchings are determined.

In general, the tiers are defined depending on the history of arrivals to a queue, history of service of a queue, the state of a queue, the guaranteed rate, and the latency or jitter. The history of arrivals is the information corresponding to when each packet arrived in the queue, i.e., what time slot the packet arrived. Similarly, the history of service of the queue is the information regarding the time slots in which the queue was serviced, and what packets and how many packets were serviced. Other information about certain types of queues, such as queues with partial packets or expedited forwarding queues, and also be used in assigning queues to tiers.

FIG. 15 depicts a classification of queues into seven tiers (each tier can have 0 queues up to a large number of queues within it during a given timeslot) based on six different properties or parameters. These properties or parameters can broadly be referred to as queue state information.

The first parameter in FIG. 15 is whether the queue is "special." A queue can be "special," for example, when it contains a "partial" packet, which is defined in greater detail above. Generally, a queue is special if it requires connection in consecutive timeslots for some reason. If a queue is special, it is desirable to service that queue immediately (i.e., for a partial packet). Tier "S" in FIG. 15 is therefore a tier for special queues. A parameter relating to a "partial" packet or a "special" queue can be passed to the arbiter in order to allow a queue to be assigned to the "special" tier "S."

Another parameter that can be considered in classifying queues into tiers is whether the queue is empty. The length of the queue can be examined to determine whether that queue is empty. FIG. 15 contains tier "F" for queues that are empty. The length of each queue, which is referred to as a "Qlength" above, is a measure of the size of the data stored at a particular instant in time within a given queue, and can therefore be measured in bytes. Its value ranges in size from 0 to an allowed maximum. Referring to FIGS. 2 and 3A, the queue manager 112 can calculate or track arrival rate information of data to the queue, and the queue length module 162 can calculate the current length or size of the queue. Each time a new packet arrives to a queue, the Qlength value is incremented by the size of that packet. Similarly, each time a packet leaves the queue, the Qlength value is decremented by the size of that packet.

Another parameter that can be considered in classifying queues into tiers is an "age" factor. An age factor of the queue is a value denoting how long it has been since the queue was last serviced. At regular intervals, this age factor is incremented by one. For instance, the age factor can be incremented by one after each timeslot in which the given queue is not serviced. Further, whenever a packet departs from a given queue, the age factor can be reset to zero for that queue. When the value of this parameter exceeds a certain threshold or predefined number of timeslots (such as, for example, 1,000), the queue is deemed "aged." If a queue, therefore, has not been serviced for a long time, its age factor can be large enough so that the queue is deemed to be "aged." FIG. 15 depicts tier "A," which is a tier for queues that are not empty and that are aged.

Whether a queue is "anemic" or not can also be considered in classifying each queue into one of the tiers. If a queue has not been receiving as many packets as it can handle, or if it is receiving far fewer packets than it can handle, it can be classified as anemic. If a queue is classified as anemic, it can be grouped into a tier that will not be matched until all of the other tiers with packets have been considered. FIG. 15, for instance, depicts tier "E" as having queues that are anemic, and tier "E" is the second lowest tier—just above a tier containing empty queues.

Whether a queue is "hungry" or not can also be considered in classifying the queues into tiers. A queue can be considered hungry if it is receiving less than its guaranteed bandwidth. Similarly, a queue that is receiving more than its guaranteed bandwidth can be considered "satisfied," or not hungry. FIG. 15 depicts tier "D" as containing queues that are not hungry, and tiers "B" and "C" as having queues that are hungry. Generally, queues in tiers "B" and "C" (that is, hungry queues) should be matched with egresses before queues in tier "D" (that is, satisfied queues). Tier "D" therefore has a lower priority than tiers "B" and "C."

Generally, in order to determine whether a queue is anemic, hungry, or satisfied, a guaranteed rate and a credit value for each queue can be considered. Generally, a guaranteed rate is the rate that has been guaranteed to that queue. It determines the bandwidth available to the queue, and is typically represented in terms of "bits per second." This parameter is updated at regular intervals (usually not once per timeslot, but once for a block of timeslots as set forth above). Some methods of calculating guaranteed rates are set forth above in connection with a number of the Figures (such as FIG. 5), and guaranteed rates are depicted as numeral 52 in FIG. 3A.

A credit value can also be associated with each queue. Generally, the credit value for a given queue can be increased after each timeslot in which the queue is not serviced. If the queue is serviced during a given timeslot, the credit value for the queue can be decreased. The determination of credit values for queues is detailed above in connection with FIG. 8. As explained in greater detail above, the guaranteed rate for each queue can be used to increase the credit value for the queue (in a case where the queue was not serviced during a given timeslot).

Typically, if the credit value of a queue is less than 0, it implies that the queue is receiving more service than the bandwidth specified by its guaranteed bandwidth. Such a queue can be considered "satisfied" (or not hungry as shown for tier "D" in FIG. 15). Similarly, if the credit value of a queue is greater than 0, then it implies the queue is receiving less than its guaranteed bandwidth. Such a queue can be considered hungry, as shown for tiers "B" and "C" in FIG. 15. Finally, if the credit value of a queue is equal to 0, it implies that the queue is receiving its guaranteed bandwidth. Such a queue can be considered not hungry in one embodiment, or hungry in another embodiment. In some embodiments, the magnitude (either positive or negative) of a credit value can be capped.

Another type of information about queues that can be considered in classifying the queues into tiers is the type of queue. Some queues can be classified as expedited forwarding queues or assured forwarding queues. An expedited forwarding queue is a queue that is generally serviced before other queues of the ingress regardless of credit value. In the embodiment of FIG. 15, "aged" queues (as well as queues with partial packets) are placed in a higher tier than expedited forwarding queues and are therefore serviced before expedited forwarding queues, but this need not be the case. Expedited forwarding queues could, for example, be placed in a tier above "aged" queues. An assured forwarding queue is a queue that is also generally serviced before other queues, but after expedited forwarding queues. FIG. 15, therefore, uses tier "B" for expedited forwarding queues and tier "C" for assured forwarding queues.

The tier classification set forth in FIG. 15 is exemplary only. A larger or a smaller number of tiers can be used within the scope of the invention. For example, in one embodiment, there might not be a tier for "aged" queues. In another embodiment, there might not be a tier for assured forwarding queues. In still another embodiment, there can be additional tiers. For instance, all of the tiers of FIG. 15 can be used along with another tier that is for queues that are hungry but that do not fit within the tiers for expedited forwarding queues or assured forwarding queues. For example, there could be a tier between tiers "C" and "D" of FIG. 15 that is for queues that are hungry. Such a grouping of tiers would have eight tiers instead of the seven depicted in FIG. 15.

In the embodiment of FIG. 15, the highest priority value, 6, is assigned to queues that belong to the special tier "S." The second highest priority value, 5, is assigned to queues that belong to tier "A." The third highest priority value, 4, is assigned to queues that belong to tier "B." The fourth highest priority value, 3, is assigned to queues that belong to tier "C." The fifth highest priority value, 2, is assigned to queues that belong to tier "D," and the sixth highest priority value, 1, is assigned to queues that belong to tier "E." Finally, the last (seventh) priority value, 0, is assigned to queues that belong to tier "F."

In this manner, the queues are first classified according to their type and/or requirements or characteristics and assigned priorities, and then maximal matching is performed on each list of queues of a given priority in decreasing order of priorities to match them with egresses. By maximally matching ingresses to egresses for the higher priority queues before the lower priority queues, the present invention ensures that the match of a particular ingress to egress in a timeslot is not done at the expense of a different match of that ingress or egress to another egress or ingress that might need the pairing more urgently in order for QoS guarantees to be met. Thus, the method is able to maintain QoS guarantees in the presence of traffic overload for a range of speedups in the switch.

The method described herein can be used in conjunction with various bandwidth allocation strategies, such as those detailed above in connection with FIG. 5. In one scenario according to the invention, tiered maximal matching is used per timeslot with associated assigned rates to each virtual output queue (VOQ). A more general scenario is that in which groups of VOQs are assigned a collective guaranteed rate. A bandwidth allocator dynamically determines individual rates for each queue within a group of VOQs every time epoch, where a "time epoch" can vary from tens of timeslots to millions of timeslots or more. Thus, the tiered maximal matching makes scheduling decisions for each timeslot and the bandwidth allocator makes bandwidth allocation decisions for some block of timeslots (or time epoch).

Any references to greater and lessor, front and back, right and left, top and bottom, upper and lower, and horizontal and vertical are intended for convenience of description, not to limit the present invention or its components to any one relational, positional or spatial orientation. All dimensions of the components in the attached Figures may vary with a potential design and the intended use of an embodiment of the invention without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claim

What is claimed is:

1. A method for selecting an ingress queue for service across a shared link, comprising:
   (A) maintaining information regarding a queue metric for each ingress queue from a group of ingress queues within a plurality of ingresses;
   (B) calculating a guaranteed rate for each ingress queue based on the information and a guaranteed bandwidth amount;
   (C) using the guaranteed rate to calculate a credit value for each ingress queue;
   (D) classifying each ingress queue into a corresponding one of a number of tiers, each tier having a priority, wherein the credit values are used to classify at least some of the queues into respective tiers, each tier being assigned a different priority, and wherein classifying each queue from the group of queues includes:
      (D)(i) ascertaining a size of a first-out packet in each queue from the group of queues; and
      (D)(ii) if the size of the first-out packet in any queue from the group of queues is too large for transmission across the shared link in a single timeslot, classifying its queue into a tier having a highest priority;
   (E) matching each ingress queue to one or more available egresses among a plurality of egresses by matching ingress queues classified within tiers having higher priorities before matching ingress queues classified within tiers having lower priorities such that a maximal matching between the group of ingress queues and the one or more available egresses is achieved for each tier, the maximal matching being achieved when a number of matches between ingress queues and egresses is maximized; and
   (F) selecting the ingress queue for service across the shared link after matching each ingress queue to the one or more available egresses.

2. The method of claim 1, wherein step (D) further comprises:
   (D)(iii) classifying each ingress queue into one of at least a first tier and a second tier,
   wherein an ingress queue classified in the first tier receives less than the guaranteed bandwidth amount,
   wherein an ingress queue classified in the second tier receives more than the guaranteed bandwidth amount, and
   wherein the first tier has a higher priority than the second tier.

3. The method of claim 1, wherein step (E) comprises:
   (E)(i) selecting the tier with a highest priority for which matching has not yet been performed;
   (E)(ii) selecting one of the ingress queues within the selected tier;
   (E)(iii) matching the selected ingress queue with a desired egress if the desired egress is available;
   (E)(iv) deleting the selected ingress queue from a list of queues to be considered; and
   (E)(v) repeating steps (E)(ii) through (E)(iv) until all of the queues within the selected tier have been evaluated.

4. The method of claim 3, wherein step (E)(ii) comprises:
   (E)(ii)(a) randomly selecting one of the ingress queues within the selected tier.

5. The method of claim 1, wherein step (E) comprises:
   (E)(i) matching each ingress queue to the plurality of available egresses for each timeslot for service across the shared link.

6. The method of claim 1, wherein step (E) comprises:
(E)(i) ensuring a first ingress queue having a packet for an available egress and receiving the guaranteed bandwidth amount is not matched to the available egress if a second ingress queue having a packet for the available egress has not received the guaranteed bandwidth amount.

7. The method of claim 6, wherein step (E)(i) comprises:
(E)(i)(a) classifying the first ingress queue into a tier having a higher priority than a tier in which the second ingress queue is classified.

8. The method of claim 1, wherein step (C) comprises:
(C)(i) adjusting the credit value associated with a corresponding ingress queue from the group of ingress queues by decrementing the credit value by an appropriate amount if the corresponding ingress queue is serviced in a given timeslot and incrementing the credit value by an amount based on the guaranteed rate after the given timeslot.

9. The method of claim 8, wherein step (C) further comprises:
(C)(ii) adjusting the credit value associated with the corresponding ingress queue by decrementing the credit value by an appropriate amount if the corresponding ingress queue is serviced in the given timeslot and incrementing the credit value by an amount based on an amount for an egress.

10. The method of claim 8, wherein step (C) comprises:
(C)(ii) adjusting the credit value associated with the corresponding ingress queue by decrementing the credit value by an appropriate amount if the corresponding ingress queue is serviced in a given timeslot and incrementing the credit value by an amount based on an amount for a group of queues.

11. The method of claim 1, wherein step (D) further comprises:
(D)(iii) classifying at least one ingress queue from the group of ingress queue having a credit value greater than zero into a first tier having a higher priority than a second tier; and
(D)(iv) classifying at least one ingress queue from the group of ingress queues having a credit value less than zero into the second tier.

12. The method of claim 1, wherein step (D) further comprises:
(D)(iii) indicating a corresponding ingress queue from the group of queues as a hungry ingress queue when the credit value is greater than zero; and
(D)(iv) indicating the corresponding ingress queue as a satisfied ingress queue when the credit value is less than zero.

13. The method of claim 12, wherein step (D)(iii) comprises:
(D)(iii)(a) classifying the satisfied ingress queue into a second tier; and
(D)(iii)(b) classifying the hungry ingress queue into a first tier having a higher priority than the second tier.

14. The method of claim 1, wherein step (D) further comprises:
(D)(iii) classifying each ingress queue into the corresponding one of the number of tiers, wherein the credit value includes information about whether a corresponding ingress queue from the group of ingress queues is empty.

15. The method of claim 14, wherein step (D) further comprises:
(D)(iv) classifying ingress queues that are empty into a tier having a lowest priority.

16. The method of claim 1, wherein step (D) further comprises:
(D)(iii) classifying each ingress queue into the corresponding one of the number of tiers, wherein the credit value includes information about whether a corresponding ingress queue from the group of queues contains a partial packet is used to classify at least some of the ingress queues from of the group of queues into the tiers, wherein the partial packet is a packet that is too large for transmission across the shared link in a single timeslot.

17. The method of claim 1, wherein step (D) further comprises:
(D)(iii) classifying each ingress queue into the corresponding one of the number of tiers, wherein the classifying is based on at least two or more of:
a credit value for at least some of the ingress queue from the group of ingress queue, wherein the credit value is derived from a guaranteed rate for a corresponding ingress queue from the group of queues based on information for the corresponding ingress queue;
information about whether the corresponding ingress queue is empty;
information about whether the corresponding ingress queue contains a partial packet;
information about whether the corresponding ingress queue has been receiving as many packets as it can handle; and
information about whether the corresponding ingress queue has not been serviced for a long period of time are used to classify the at least some of the ingress queues into the tiers.

18. A method for selecting a queue for service across a shared link, comprising:
(A) classifying each queue from a group of queues within a plurality of ingresses into a corresponding one of a number of tiers,
wherein queue state information is used to classify at least some of the queues from the group of queues into a corresponding tier,
wherein each tier is assigned a different priority, and
wherein classifying each queue from the group of queues includes:
(A)(i) ascertaining a size of a first-out packet in each queue from the group of queues; and
(A)(ii) if the size of the first-out packet in any queue from the group of queues is too large for transmission across the shared link in a single timeslot, classifying its queue into a tier having a highest priority;
(B) matching each queue from the group of queues to one or more available egresses among a plurality of egresses by matching queues classified within tiers with higher priorities before matching queues classified within tiers with lower priorities; and
(C) selecting the queue for service across the shared link after matching each queue from the group of queues to the one or more available egresses.

19. A method for selecting a queue for service across a shared link, comprising:
(A) classifying each queue from a group of queues within a plurality of ingresses into a corresponding one of a number of tiers, wherein queue state information is used to classify at least some of the queues from the group of queues into the corresponding one of the number of tiers, wherein each tier of queues from the number of tiers is assigned a different priority, and wherein queues containing partial packets are classified into a tier having a highest priority;

(B) matching each queue from the group of queues to one or more available egresses in a plurality of egresses by matching queues classified within tiers with higher priorities before matching queues classified within tiers with lower priorities; and (C) selecting the queue for service across the shared link after matching the queue for service to the one or more available egresses.

20. The method of claim 19, wherein step (A) comprises:

(A)(i) classifying each queue from the group of queues within the plurality of ingresses into the corresponding one of the number of tiers, wherein information about whether each queue from the group of queues has been receiving as many packets as it can handle is used to classify at least some of the queues into the tiers.

21. The method of claim 20, wherein step (A) further comprises:

(A)(ii) classifying a queue that has not been receiving as many packets as it can handle into a tier having a priority level just above the tier having the lowest priority.

22. The method of claim 20, wherein step (A) further comprises:

(A)(ii) classifying each queue from the group of queues within the plurality of ingresses into one tier of the number of tiers, wherein information about whether a queue has not been serviced for a long period of time, wherein the long period of time is a predefined number of timeslots is used to classify at least some of the queues from the group of queues into the tiers.

23. The method of claim 22, wherein step (A)(ii) comprises:

(A)(ii)(1) classifying the queue that has not been serviced for the long period of time into a tier having a priority level just below the tier having the highest priority.

24. A method for arbitrating for access across a shared link, comprising:

(A) maintaining queue state information for each ingress queue from a group of ingress queue within a plurality of ingresses, wherein the queue state information includes a guaranteed rate for each queue and information relating to whether each ingress queue is empty, wherein the queue state information is used to classify at least some of the ingress queues from the group of ingress queues into a corresponding one of at least two tiers, wherein each tier of ingress queues from the number of tiers is assigned a different priority, and wherein ingress queues containing partial packets are classified into a tier having a highest priority;

(B) during a timeslot for service across the shared link:

(B)(i) using the queue state information to map each ingress queue into a tier from a group of at least two tiers, (B)(ii) matching some of the ingress queues from the group of queues to at least one egress within a plurality of egresses by matching at least some ingress queues within tiers having higher priorities before matching ingress queues within tiers having lower priorities such that a maximal matching between the group of ingress queues and the one or more available egresses is achieved for each tier, the maximal matching being achieved when a number of matches between ingress queues and egresses is maximized, and (C)(iii) granting access to the shared link to the ingress queues matched to the egresses during the timeslot.

25. The method of claim 24, wherein step (B)(ii) comprises:

(B)(ii)(a) selecting the tier with the highest priority, (B)(ii)(b) selecting one of the ingress queues within the selected tier, (B)(ii)(c) matching the selected ingress queue with its desired egress if the egress is available, and if the desired egress is available, deleting the egress from a list of available egresses, (B)(ii)(d) deleting the selected ingress queue from a list of ingress queues to be considered; and (B)(ii)(e) repeating steps (B)(ii)(b) through (B)(ii)(d) until all of the ingress queues within the selected tier having been evaluated.

26. A system for selecting a ingress queue for service across a shared link, comprising:

means for maintaining information regarding a queue metric for each ingress queue from a group of queues within a plurality of ingresses;

means for calculating a guaranteed rate for each ingress queue based on queue metric information and a guaranteed bandwidth amount;

means for calculating a credit value for each ingress queue using the guaranteed rate;

means for classifying each ingress queue within a plurality of ingresses into one tier of a number of tiers, wherein queue state information is used to classify at least some of the queues from the group of queues into the tiers, and wherein each tier is assigned a different priority, and wherein ingress queues containing partial packets are classified into a tier having a highest priority; and means for matching each ingress queue to at least one available egress within a plurality of available egresses by matching ingress queues classified within tiers with higher priorities before matching ingress queues classified within tiers with lower priorities such that a maximal matching between the group of ingress queues and the one or more available egresses is achieved for each tier, the maximal matching being achieved when a number of matches between ingress queues and egresses is maximized.

27. A system for arbitrating for access across a shared link, comprising:

means for maintaining queue state information for each ingress queue from a group of queues within a plurality of ingresses, wherein the queue state information includes a guaranteed rate for each ingress queue and information relating to whether each ingress queue is empty, wherein the queue state information is used to classify at least some of the ingress queues from the group of queues into a corresponding one of at least two tiers, wherein each tier of ingress queues from the number of tiers is assigned a different priority, and wherein ingress queues containing partial packets are classified into a tier having a highest priority; and means for, during each timeslot for service across the shared link, mapping each ingress queue into a tier from a group of at least two tiers using the queue state information, wherein each tier has a different priority level; and means for matching, during each timeslot for service across the shared link, each ingress queue to at least one egress within a plurality of egresses by matching ingress queues within tiers having higher priorities before matching ingress queues within tiers having lower priorities such that a maximal matching between the group of ingress queues and the one or more available egresses is achieved for each tier, the maximal matching being achieved when a number of matches between ingress queues and egresses is maximized.

28. A system for selecting a ingress queue for service across a shared link, comprising:

a bandwidth allocator module to calculate a guaranteed rate for each ingress queue from a group of queues, wherein the metering module uses the guaranteed rates to determine credit values;

a metering module within a ingress to determine credit values based on the guaranteed rate for at least some ingress queues within the ingress during each timeslot for data transfer, wherein each credit value indicate whether a given ingress queue has received its allocated bandwidth; and an arbitration module configured to, during each timeslot:

map each ingress queue into a tier from a group of at least two tiers, wherein each tier has a different priority level, wherein queue state information is used to classify at least some of the ingress queues from the group of queues into the corresponding one of at least two tiers, and wherein ingress queues containing partial packets are classified into a tier having a highest priority; and match some of the ingress queues to at least one egress within a plurality of egresses by matching each ingress queue within tiers having higher priorities before matching ingress queues within tiers having lower priorities such that a maximal matching between the group of ingress queues and the one or more available egresses is achieved for each tier, the maximal matching being achieved when a number of matches between ingress queues and egresses is maximized.

29. A method for apportioning bandwidth across a shared link, comprising:

maintaining information regarding a queue metric for each ingress queue in a group of queues within a plurality of ingresses;

calculating a guaranteed rate for each ingress queue based on the queue metric information and a guaranteed bandwidth amount;

sending the guaranteed rate for each ingress queue to a corresponding ingress from the plurality of ingresses, wherein each ingress from the plurality of ingresses is capable of calculating a credit value for each ingress queue using the guaranteed rate;

receiving queue state information from at least one ingress from the plurality of ingresses, wherein the queue state information includes the credit value for at least one or more of the ingress queues, wherein the queue state information is used to classify at least some of the ingress queues from the group of queues into a corresponding one of at least two tiers, wherein each tier of ingress queues from the at least two tiers is assigned a different priority, and wherein ingress queues containing partial packets are classified into a tier having a highest priority;

mapping each ingress queue into a tier from a group of at least two tiers by using the credit values, wherein each tier has a different priority level; and matching each of the ingress queues to a plurality of egresses by matching ingress queues within tiers having higher priorities before matching queues within tiers having lower priorities such that a maximal matching between the group of ingress queues and the one or more available egresses is achieved for each tier, the maximal matching being achieved when a number of matches between ingress queues and egresses is maximized; and apportioning a bandwidth of the shared link to the each of the ingress queues matched to egresses.

* * * * *

UNITED STATES PATENT AND TRADEMARK OFFICE
CERTIFICATE OF CORRECTION

PATENT NO.      : 7,724,760 B2
APPLICATION NO. : 10/639269
DATED           : May 25, 2010
INVENTOR(S)     : Balakrishnan et al.

It is certified that error appears in the above-identified patent and that said Letters Patent is hereby corrected as shown below:

Column 1
Line 28, please replace "El," with --E1,--.

Column 1
Line 25, please replace "El," with --E1,--.

Column 11
Lines 46-47, please replace " $F_{j,q}=\sum_{i:} \text{inputs } g^i_{j,q}(t)$ " with -- $F_{j,q}=\sum_{i: \text{inputs}} g^i_{j,q}(t)$ --.

Column 12
Line 8, please replace " $\sum E_{k: \text{inputs}} L^k_{j,q}(t)$ " with -- $\sum_{k: \text{inputs}} L^k_{j,q}(t)$ --.

Column 12
Line 20, please replace " $\sum_{k: \text{inputs}} L^k_{j,q}(t)$ " with -- $\sum_{k: \text{inputs}} L^k_{j,q}(t)$ --.

Column 14
Line 23, please replace " $\sum_{k: \text{output}} L^i_{k,q}(t),$ " with -- $\sum_{k: \text{outputs}} L^i_{k,q}(t),$ --.

Column 15
Line 26, please replace " $\sum_{i: \text{inputs}} L^i_q(t)$ " with -- $\sum_{i: \text{inputs}} L^i_q(t)$ --.

Column 19
Line 6, please replace "$S_{limit}$will" with --$S_{limit}$ will--.

Signed and Sealed this

Fourteenth Day of September, 2010

David J. Kappos
*Director of the United States Patent and Trademark Office*

Column 22
Line 53, please replace "FIF02" with --FIFO2--.

Column 25
Line 33, please replace "13" with --I3--.

Column 34
Line 2, please replace "claim" with --claims.--.

Column 38
Line 54, please delete "and" after "priority;".